United States Patent
Geiss et al.

(10) Patent No.: US 9,749,551 B2
(45) Date of Patent: *Aug. 29, 2017

(54) NOISE MODELS FOR IMAGE PROCESSING

(71) Applicant: Google Inc., Mountain View, CA (US)

(72) Inventors: Ryan Geiss, Mountain View, CA (US); Changyin Zhou, Mountain View, CA (US); Samuel William Hasinoff, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/491,429

(22) Filed: Apr. 19, 2017

(65) Prior Publication Data
US 2017/0223282 A1 Aug. 3, 2017

Related U.S. Application Data

(63) Continuation of application No. 13/759,749, filed on Feb. 5, 2013, now Pat. No. 9,686,537.

(51) Int. Cl.
*H04N 9/73* (2006.01)
*H04N 5/225* (2006.01)
(Continued)

(52) U.S. Cl.
CPC ......... *H04N 5/265* (2013.01); *G06F 17/3025* (2013.01); *G06K 9/6202* (2013.01);
(Continued)

(58) Field of Classification Search
CPC .... H04N 17/002; H04N 5/2355; H04N 5/357; H04N 5/217; G06T 5/50; G06T 2207/20208; G06T 2207/20221
See application file for complete search history.

(56) References Cited

U.S. PATENT DOCUMENTS

| 4,644,582 A | 2/1987 | Morishita et al. |
| 5,781,308 A | 7/1998 | Fujii et al. |

(Continued)

FOREIGN PATENT DOCUMENTS

| JP | 2005-045804 | 2/2005 |
| JP | 2012-029029 | 2/2012 |

(Continued)

OTHER PUBLICATIONS

"Exposure (photography)," Wikipedia, the free encyclopedia, Jun. 21, 2012, pp. 1-8 (http://en.wikipedia.org/wiki/Autoexposure#Automatic_exposure).

(Continued)

*Primary Examiner* — Twyler Haskins
*Assistant Examiner* — Carramah J Quiett
(74) *Attorney, Agent, or Firm* — McDonnell Boehnen Hulbert & Berghoff LLP

(57) ABSTRACT

A plurality of images of a scene may be obtained. These images may have been captured by an image sensor, and may include a first image and a second image. A particular gain may have been applied to the first image. An effective color temperature and a brightness of a first pixel in the first image may be determined, and a mapping between pixel characteristics and noise deviation of the image sensor may be selected. The pixel characteristics may include pixel brightness. The selected mapping may be used to map at least the brightness of the first pixel to a particular noise deviation. The brightness of the first pixel and the particular noise deviation may be compared to a brightness of a second pixel of the second image. The comparison may be used to determine whether to merge the first pixel and the second pixel.

20 Claims, 8 Drawing Sheets

(51) Int. Cl.
| | | |
|---|---|---|
| H04N 5/265 | (2006.01) | |
| G06T 7/90 | (2017.01) | |
| H04N 5/357 | (2011.01) | |
| G06K 9/62 | (2006.01) | |
| G06F 17/30 | (2006.01) | |

(52) U.S. Cl.
CPC ............... *G06T 7/90* (2017.01); *H04N 5/357* (2013.01); *G06F 17/3028* (2013.01)

(56) References Cited

U.S. PATENT DOCUMENTS

| | | |
|---|---|---|
| 5,828,793 A | 10/1998 | Mann |
| 5,926,190 A | 7/1999 | Turkowski et al. |
| 6,061,091 A | 5/2000 | Van de Poel et al. |
| 6,075,905 A | 6/2000 | Herman et al. |
| 6,101,285 A | 8/2000 | Fan |
| 6,204,881 B1 | 3/2001 | Ikeda et al. |
| 6,539,116 B2 | 3/2003 | Takaoka |
| 6,693,718 B1 | 2/2004 | Takaoka |
| 6,925,121 B1 | 8/2005 | Komiya et al. |
| 6,975,755 B1 | 12/2005 | Baumberg |
| 7,098,946 B1 | 8/2006 | Koseki et al. |
| 7,173,666 B1 | 2/2007 | Masaki et al. |
| 7,239,805 B2 | 7/2007 | Uyttendaele et al. |
| 7,626,614 B1 | 12/2009 | Marcu |
| 7,667,764 B2 | 2/2010 | Kamon et al. |
| 7,840,093 B2 | 11/2010 | Fu et al. |
| 7,903,168 B2 | 3/2011 | Pillman et al. |
| 7,924,321 B2 | 4/2011 | Nayar et al. |
| 7,940,325 B2 | 5/2011 | Kim et al. |
| 7,944,485 B2 | 5/2011 | Ovsiannikov |
| 8,023,004 B2 | 9/2011 | Asoma |
| 8,059,891 B2 | 11/2011 | Li et al. |
| 8,072,507 B2 | 12/2011 | Fuh et al. |
| 8,094,211 B2 | 1/2012 | Kwon et al. |
| 8,200,020 B1 | 6/2012 | Geiss et al. |
| 8,208,048 B2 | 6/2012 | Lin et al. |
| 8,237,813 B2 | 8/2012 | Garten |
| 8,406,560 B2 | 3/2013 | Lee et al. |
| 8,411,962 B1 | 4/2013 | Geiss et al. |
| 8,446,481 B1 | 5/2013 | Geiss et al. |
| 8,576,295 B2 | 11/2013 | Ito |
| 8,866,927 B2 | 10/2014 | Levoy et al. |
| 8,866,928 B2 | 10/2014 | Geiss et al. |
| 8,885,976 B1 | 11/2014 | Kuo et al. |
| 2001/0019362 A1 | 9/2001 | Nakamura et al. |
| 2003/0002750 A1 | 1/2003 | Ejiri et al. |
| 2003/0095192 A1 | 5/2003 | Horiuchi |
| 2004/0160525 A1 | 8/2004 | Kingetsu et al. |
| 2005/0147322 A1 | 7/2005 | Saed |
| 2005/0163380 A1 | 7/2005 | Wang et al. |
| 2005/0239104 A1 | 10/2005 | Ferea et al. |
| 2005/0243176 A1 | 11/2005 | Wu et al. |
| 2006/0269155 A1 | 11/2006 | Tener et al. |
| 2006/0291740 A1 | 12/2006 | Kim et al. |
| 2007/0003261 A1 | 1/2007 | Yamasaki |
| 2007/0147824 A1 | 6/2007 | Hamamura |
| 2008/0094486 A1 | 4/2008 | Fuh et al. |
| 2008/0253758 A1 | 10/2008 | Yap et al. |
| 2008/0278633 A1 | 11/2008 | Tsoupko-Sitnikov et al. |
| 2008/0298717 A1 | 12/2008 | Lee |
| 2008/0304087 A1 | 12/2008 | Shin et al. |
| 2009/0040364 A1 | 2/2009 | Rubner |
| 2009/0123082 A1 | 5/2009 | Atanssov et al. |
| 2009/0185622 A1 | 7/2009 | Itoh et al. |
| 2009/0207258 A1 | 8/2009 | Jang et al. |
| 2009/0222625 A1 | 9/2009 | Ghosh et al. |
| 2009/0231445 A1 | 9/2009 | Kanehiro |
| 2009/0231449 A1 | 9/2009 | Tzur et al. |
| 2009/0231468 A1 | 9/2009 | Yasuda |
| 2009/0244301 A1 | 10/2009 | Border et al. |
| 2009/0268963 A1 | 10/2009 | Kang et al. |
| 2009/0274387 A1 | 11/2009 | Jin |
| 2009/0322901 A1 | 12/2009 | Subbotin et al. |
| 2010/0066858 A1 | 3/2010 | Asoma |
| 2010/0103194 A1 | 4/2010 | Chen et al. |
| 2010/0150473 A1 | 6/2010 | Kwon et al. |
| 2010/0157078 A1 | 6/2010 | Atanassov et al. |
| 2010/0165075 A1 | 7/2010 | Chou et al. |
| 2010/0166337 A1 | 7/2010 | Murashita et al. |
| 2010/0265357 A1 | 10/2010 | Liu et al. |
| 2010/0277631 A1 | 11/2010 | Sugiyama |
| 2010/0321539 A1 | 12/2010 | Ito |
| 2010/0328490 A1 | 12/2010 | Kurane et al. |
| 2010/0328491 A1 | 12/2010 | Ovsiannikov |
| 2011/0047155 A1 | 2/2011 | Sohn et al. |
| 2011/0069200 A1 | 3/2011 | Oh et al. |
| 2011/0085697 A1 | 4/2011 | Clippard et al. |
| 2011/0149111 A1 | 6/2011 | Prentice et al. |
| 2011/0157426 A1 | 6/2011 | Lin et al. |
| 2011/0200265 A1 | 8/2011 | Prigent |
| 2011/0222793 A1 | 9/2011 | Ueda et al. |
| 2011/0228993 A1 | 9/2011 | Reilly et al. |
| 2011/0254976 A1 | 10/2011 | Garten |
| 2011/0279706 A1 | 11/2011 | Lesiak et al. |
| 2012/0002082 A1 | 1/2012 | Johnson et al. |
| 2012/0002898 A1 | 1/2012 | Cote et al. |
| 2012/0002899 A1 | 1/2012 | Orr, IV et al. |
| 2012/0044381 A1 | 2/2012 | Jannard et al. |
| 2012/0050557 A1 | 3/2012 | Atanassov et al. |
| 2012/0105681 A1 | 5/2012 | Morales |
| 2012/0127348 A1 | 5/2012 | Li |
| 2012/0189191 A1 | 7/2012 | Bai et al. |
| 2012/0189197 A1 | 7/2012 | Li et al. |
| 2012/0201426 A1 | 8/2012 | Jasinski et al. |
| 2012/0201450 A1 | 8/2012 | Bryant et al. |
| 2012/0201456 A1 | 8/2012 | El-Mahdy et al. |
| 2012/0219235 A1 | 8/2012 | Solhusvik et al. |
| 2012/0249828 A1 | 10/2012 | Sun |
| 2012/0308126 A1 | 12/2012 | Hwang et al. |
| 2012/0314100 A1 | 12/2012 | Frank |
| 2013/0033616 A1 | 2/2013 | Kaizu et al. |
| 2013/0083216 A1 | 4/2013 | Jiang et al. |
| 2013/0100314 A1 | 4/2013 | Li et al. |
| 2013/0121569 A1 | 5/2013 | Yadav |
| 2013/0329092 A1 | 12/2013 | Wong |
| 2014/0042233 A1 | 2/2014 | Yang |
| 2014/0219578 A1 | 8/2014 | Peng et al. |

FOREIGN PATENT DOCUMENTS

| | | |
|---|---|---|
| KR | 10-2007-0085867 | 8/2007 |
| KR | 10-0911814 | 8/2009 |
| KR | 10-2010-0086987 | 8/2010 |
| WO | 98/02844 | 1/1998 |
| WO | 2004/098167 | 11/2004 |
| WO | 2011/093994 | 8/2011 |
| WO | 2011/102850 | 8/2011 |
| WO | 2012/027290 | 3/2012 |
| WO | 2012/039669 | 3/2012 |
| WO | 2012/061261 | 5/2012 |
| WO | 2012/098842 | 7/2012 |
| WO | 2012/110894 | 8/2012 |

OTHER PUBLICATIONS

"High dynamic range imaging," Wikipedia, the free encyclopedia, Jun. 21, 2012, pp. 1-11 (http://en.wikipedia.org/wiki/High_dynamic_range_imaging).
"JPEG," Wikipedia, the free encyclopedia, Jul. 31, 2012, pp. 1-16 (http://en.wikipedia.org/wiki/JPEG).
"Metering mode," Wikipedia, the free encyclopedia, Jun. 25, 2012, pp. 1-3 (http://en.wikipedia.org/wiki/Metering_mode).
"Tone mapping," Wikipedia, the free encyclopedia, Jun. 21, 2012, pp. 1-10 (http://en.wikipedia.org/wiki/Tone_mapping).
"YCbCr," Wikipedia, the free encyclopedia, Jul. 31, 2012, pp. 1-5 (http://en.wikipedia.org/wiki/YCbCr).
Bauer et al., "Comparing Several Implementations of Two Recently Published Feature Detectors," In Proc. of the International Conference on Intelligent and Autonomous Systems, IAV, Toulouse, France (2007).

(56) References Cited

OTHER PUBLICATIONS

Bay et al., "SURF: Speeded Up Robust Features," 9th European Conference on Computer Vision, 2008, pp. 346-359, vol. 110, No. 3.
Brown, M. & Lowe, D., "Invariant Features from Interest Point Groups," Computer, (2002) p. 253-262, Available at: http://citeseerx.ist.psu.edu/viewdoc/download?doi=10.1.1.73.5616&rep=rep1&type=pdf.
Cyganek, Boguslaw, "Comparison of nonparametric transformations and bit vector matching for stereo correlation." Combinatorial Image Analysis, 2005, pp. 534-547.
Corrected Notice of Allowability U.S. Appl. No. 13/902,253 mailed Mar. 27, 2015, 2 pages.
Duan et al., "Tone-mapping High Dynamic Range Images by Novel Histogram Adjustment," Pattern Recognition, 2010, 39 pages, vol. 43, No. 5.
Fife, Wade S. et al., "Improved Census Transforms for Resource-Optimized Stereo Vision," IEEE Transactions on Circuits and Systems for Video Technology, Jan. 2013, vol. 23, No. 1, pp. 60-73.
Final Office Action for U.S. Appl. No. 13/863,981 mailed Dec. 24, 2014, 21 pages.
Final Office Action, U.S. Appl. No. 13/863,981 mailed Apr. 8, 2014, 26 pages.
Gelfand, Natasha, et al. "Multi-exposure imaging on mobile devices." In Proceedings of the international conference on Multimedia, ACM, 2010, pp. 823-826.
Hansen, Christian et al., "Chapter 1: The Image Deblurring Problem," Deblurring Images: Matrices, Spectra, and Filtering, SIAM, Philadelphia, 2006, pp. 1-12.
International Search Report and Written Opinion for PCT/US2014/011498 mailed Apr. 22, 2014, 11 pages.
International Searching Authority, International Preliminary Report on Patentability for International application No. PCT/US2013/071459 mailed Aug. 11, 2015, 5 pages.
International Searching Authority, International Preliminary Report on Patentability for International application No. PCT/US2013/072564 mailed Jul. 2, 2015, 9 pages.
International Searching Authority, International Search Report and Written Opinion for International Applicaiton No. PCT/US2014/038963 mailed Sep. 17, 2014, 12 pages.
International Searching Authority, International Search Report and Written Opinion for PCT/US2013/071459 mailed Mar. 13, 2014, 9 pages.
International Searching Authority, International Search Report and Written Opinion for PCT/US2013/071618 mailed Mar. 3, 2014, 9 pages.
International Searching Authority, International Search Report and Written Opinion for PCT/US2013/071663 mailed Mar. 13, 2014, 9 pages.
International Searching Authority, International Search Report and Written Opinion for PCT/US2013/072569 mailed Mar. 6, 2014, 9 pages.
International Searching Authority, International Search Report and Written Opinion for PCT/US2013/072638 mailed Mar. 11, 2014, 10 pages.
International Searching Authority, International Search Report and Written Opinion for PCT/US2013/72564 mailed Mar. 11, 2014, 13 pages.
Jin et al., "Face Detection Using Improved LBP Under Bayesian Framework," Proceedings of the Third International Conference on Image and Graphics (ICIG'04), 2004, pp. 1-4.
Karpenko et al., "Digital Video Stabilization and Rolling Shutter Correction using Gyroscopes," Stanford Tech Report CTSR Mar. 2011, http://graphics.stanford.edu/papers/stabilization/karpenko_gyro.pdf (Sep. 2011).
Lowe, D.G., "Object Recognition from Local Scale-Invariant Features," Proc. of the International Conference on Computer Vision, Sep. 20-22, 1999, pp. 1150-1157, vol. 2.

Mandava et al., "Speckle Noise Reduction Using Local Binary Pattern," 2nd International Conference on Communication, Computing & Security (ICCCS-2012), Procedia Technology, 2012, pp. 574-581, vol. 6.
Nayar et al., "Adaptive Dynamic Range Imaging: Optical Control of Pixel Exposures Over Space and Time," Proceedings of the Ninth IEEE International Conference on Computer Vision (ICCV'03), 2003, pp. 1-8.
Notice of Allowance for U.S. Appl. No. 13/713,734 mailed Apr. 14, 2015, 11 pages.
Notice of Allowance for U.S. Appl. No. 13/847,238 mailed Apr. 10, 2015, 5 pages.
Notice of Allowance for U.S. Appl. No. 13/849,824 mailed Apr. 9, 2015, 12 pages.
Notice of Allowance for U.S. Appl. No. 13/902,253 mailed Mar. 9, 2015, 7 pages.
Notice of Allowance for U.S. Appl. No. 13/305,389 mailed Feb. 22, 2012, 9 pages.
Notice of Allowance for U.S. Appl. No. 13/458,334 mailed Oct. 11, 2012, 34 pages.
Notice of Allowance for U.S. Appl. No. 13/610,288 mailed Feb. 28, 2013, 31 pages.
Notice of Allowance for U.S. Appl. No. 13/713,720 mailed Jul. 18, 2014, 13 pages.
Notice of Allowance for U.S. Appl. No. 13/718,533 mailed Jul. 18, 2014, 9 pages.
Notice of Allowance for U.S. Appl. No. 13/743,565 mailed Dec. 2, 2014, 15 pages.
Notice of Allowance for U.S. Appl. No. 13/863,981 mailed Apr. 9, 2015, 8 pages.
Notice of Allowance for U.S. Appl. No. 14/455,444 mailed Oct. 2, 2014, 9 pages.
Özuysal et al., "Fast Keypoint Recognition in Ten Lines of Code," Computer Vision and Pattern Recognition, IEEE Computer Society Conference on in Computer Vision and Pattern Recognition, 2007. CVPR '07. IEEE Conference on, vol. 0 (2007), pp. 1-8. doi:10.1109/CVPR.2007.383123 Key: citeulike:2943111.
Office Action for U.S. Appl. No. 13/713,734 mailed Dec. 24, 2014, 12 pages.
Office Action for U.S. Appl. No. 13/718,533 mailed Apr. 22, 2014, 48 pages.
Office Action for U.S. Appl. No. 13/722,519 mailed Feb. 19, 2015, 11 pages.
Office Action for U.S. Appl. No. 13/722,519 mailed Sep. 4, 2014, 10 pages.
Office Action for U.S. Appl. No. 13/743,565 mailed Sep. 4, 2014, 20 pages.
Office Action for U.S. Appl. No. 13/847,238 mailed Jan. 2, 2015, 6 pages.
Office Action for U.S. Appl. No. 13/849,824 mailed Nov. 5, 2014, 14 pages.
Office Action for U.S. Appl. No. 13/863,981 mailed Jun. 24, 2014, 23 pages.
Office Action for U.S. Appl. No. 13/863,981 mailed Oct. 7, 2013, 45 pages.
Office Action for U.S. Appl. No. 13/902,254 mailed Dec. 2, 2014, 9 pages.
Office Action for U.S. Appl. No. 13/902,267 mailed Dec. 12, 2014, 12 pages.
Office Action for U.S. Appl. No. 14/488,891 mailed Feb. 13, 2015, 6 pages.
Office Action for U.S. Appl. No. 14/582,470 mailed Feb. 26, 2015, 7 pages.
Office Action, U.S. Appl. No. 13/713,720, mailed Apr. 8, 2014, 46 pages.
Seemann, Torsten et al., "Structure preserving noise filtering of images using explicit local segmentation." Fourteenth International Conference on Pattern Recognition, IEEE, 1998, pp. 1610-1612, vol. 2.
Sift, accessed on Oct. 21, 2011, from Wikipedia, http://en.wikipedia.org/w/index.php?title=Special:Book&bookcmd=download&collection_id=lbf75abdad524091&writer=rl&return_to=Scale-invariant+feature+transform.

(56) References Cited

OTHER PUBLICATIONS

Sinha et al., "Feature Tracking and Matching in Video Using Programmable Graphics Hardware," Machine Vision and Applications, DOI 10.1007/s00138-007-0105-z, Nov. 2007.
Surf, accessed on Oct. 24, 2011, from Wikipedia, http://en.wikipedia.org/wiki/SURF.
SynthCam iPhone, https://sites.google.com/site/marclevoyiTutorial accessed Oct. 24, 2011.
Ta, Duy-Nguyen et al., "SURFTrac: Efficient Tracking and Continuous Object Recognition using Local Feature Descriptors," IEEE Computer Society Conference on Computer Vision and Pattern Recognition, 2009, pp. 2937-2944.
Wagner et al., "Pose Tracking from Natural Features on Mobile Phones," Proceeding ISMAR '08 Proceedings of the 7th IEEE/ACM International Symposium on Mixed and Augmented Reality IEEE Computer Society Washington, DC, USA, Sep. 15-18, 2008, pp. 125-134.
Wagner et al., "Real-time detection and tracking for augmented reality on mobile phones," IEEE Trans Vis Comput Graph, May-Jun. 2010, pp. 355-368, vol. 16, No. 3.
Winder, S.A.J. and Brown, M., "Learning Local Image Descriptors," Computer Vision and Pattern Recognition, 2007. CVPR '07. IEEE Conference on in Computer Vision and Pattern Recognition, 2007. CVPR '07. IEEE Conference an (Jun. 2007), pp. 1-8. doi:10.1109/CVPR.2007.382971 Key: citeulike:1663569.
Zabih et al., "Non-parametric Local Transforms for Computing Visual Correspondence," In Proceedings of European Conference on Computer Vision, Stockholm, Sweden, May 1994, pp. 151-158.

NOISE MODELS FOR IMAGE PROCESSING

CROSS-REFERENCE TO RELATED APPLICATION

This application is a continuation of and claims priority to U.S. patent application Ser. No. 13/759,749, filed Feb. 5, 2013, which is hereby incorporated by reference in its entirety.

BACKGROUND

Generally, imaging may refer to capturing and representing the color and brightness characteristics of digital images (e.g., photographs and motion video). Low dynamic range (LDR) imaging may represent digital images with 8 or fewer bits for each color channel of a pixel. As a result, up to 256 levels of brightness may be supported. Currently, a wide range of video output devices (e.g., computer monitors, tablet and smartphone screens, televisions, etc.) support displaying LDR images.

However, real-world scenes often exhibit a wider range of brightness than can be represented by LDR imaging. As an example scene with a wide brightness range, consider an individual standing in a dark room in front of a window. This scene may include both extremely bright regions (e.g., sunlit features outside the window) and extremely dark regions (e.g., the features in the room). Ideally, an image of this scene would include both the details in the bright regions and the details in the dark regions.

SUMMARY

A noise model of an image sensor and/or a camera device associated with the image sensor may be obtained. This noise model may be used to determine a noise deviation of the image sensor and/or camera device. For instance, the noise introduced by the image sensor and/or camera device may vary based on a captured pixel's brightness and color values. When merging two or more images, the noise model may be used to compare corresponding pixels of the images. If the corresponding pixels from one or more of the images differ by more than a noise deviation defined by the noise model, those pixels may be omitted when the images are merged. Alternatively or additionally, such a noise model may be used as part of image de-noising procedures, or for classifying pairs of aligned pixels in two images as in conflict or not.

Accordingly, in a first example embodiment, a plurality of images of a scene may be obtained. The plurality of images may have been captured by an image sensor, and may include a first image and a second image. A particular gain may have been applied to the first image. An effective color temperature and a brightness of a first pixel in the first image may be determined. Based on the effective color temperature and the particular gain, a mapping between pixel characteristics and noise deviation of the image sensor may be selected. The pixel characteristics may include pixel brightness. The selected mapping may be used to map at least the brightness of the first pixel to a particular noise deviation. The brightness of the first pixel and the particular noise deviation may be compared to a brightness of a second pixel of the second image. The first and second images may have been aligned, at least to some extent. The comparison may be used to determine whether to merge the first pixel and the second pixel.

A second example embodiment may include means for obtaining a plurality of images of a scene captured by an image sensor, wherein the plurality of images includes a first image and a second image, and wherein a particular gain has been applied to the first image. The second example embodiment may also include means for determining an effective color temperature and a brightness of a first pixel in the first image, and means for, based on the effective color temperature and the particular gain, selecting a mapping between pixel characteristics and noise deviation of the image sensor, wherein the pixel characteristics include pixel brightness. The second example embodiment may further include means for using the selected mapping to map at least the brightness of the first pixel to a particular noise deviation. The second example embodiment may additionally include means for comparing the brightness of the first pixel and the particular noise deviation to a brightness of a second pixel of the second image, and means for, based on the comparison, determining whether to merge the first pixel and the second pixel.

A third example embodiment may include a non-transitory computer-readable storage medium, having stored thereon program instructions that, upon execution by a computing device, cause the computing device, and/or its peripherals, to perform operations in accordance with the first and/or second example embodiment.

A fourth example embodiment may include a computing device, comprising at least a processor and data storage. The data storage may contain program instructions that, upon execution by the processor, cause the computing device operate in accordance with the first and/or second example embodiment.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
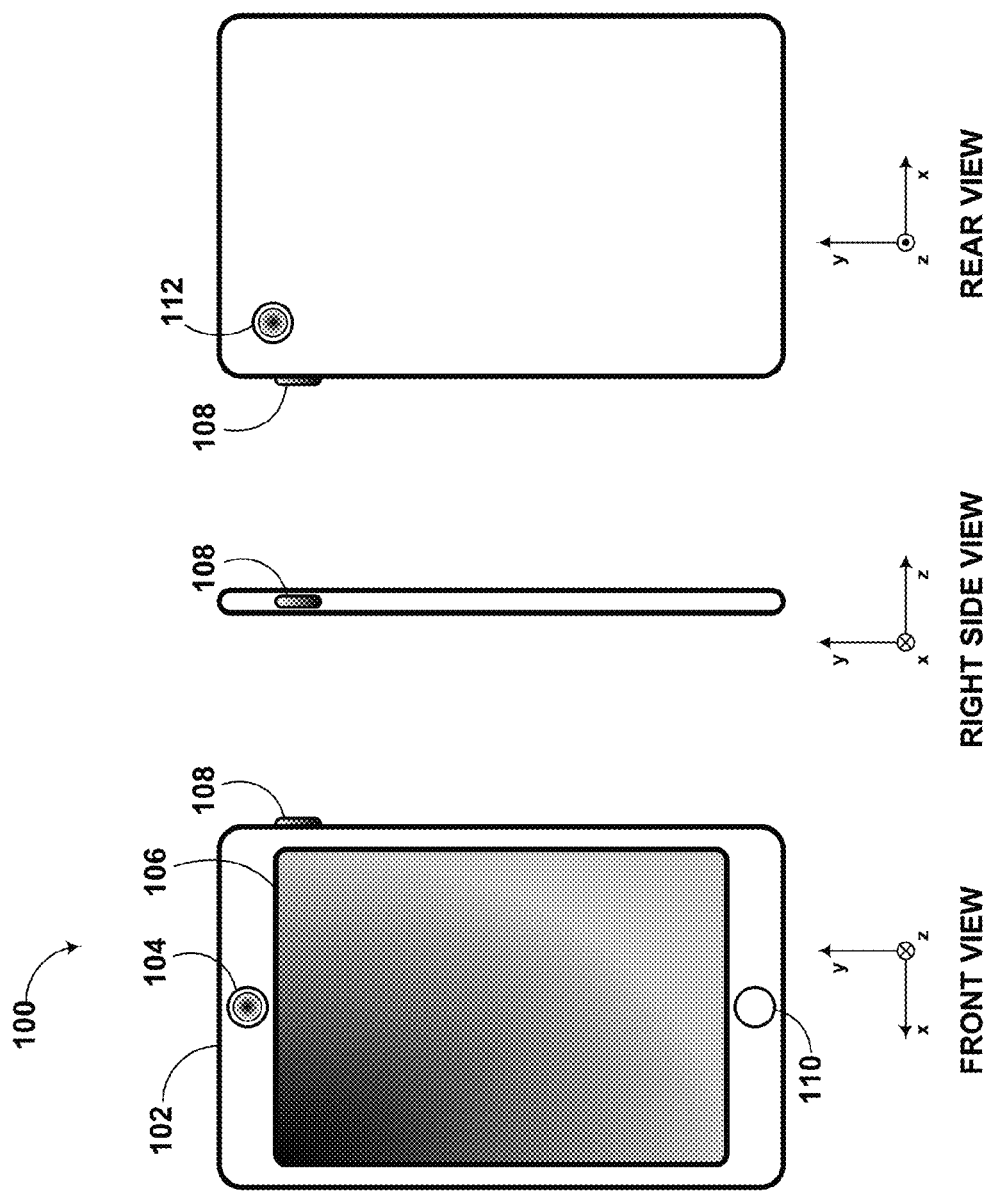
FIG. 1 depicts front, right side, and rear views of a digital camera device, in accordance with an example embodiment.

As image capture devices, such as cameras, become more popular, they may be employed as standalone hardware devices or integrated into various other types of devices. For instance, still and video cameras are now regularly included in wireless communication devices (e.g., mobile phones), tablet computers, laptop computers, video game interfaces, home automation devices, and even automobiles and other types of vehicles.

The physical components of a camera may include an aperture through which light enters, a recording surface for capturing the image represented by the light, and a lens positioned in front of the aperture to focus at least part of the image on the recording surface. The aperture may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

A shutter may be coupled to or nearby the lens or the recording surface. The shutter may either be in a closed position, in which it blocks light from reaching the recording surface, or an open position, in which light is allowed to reach to recording surface. The position of the shutter may be controlled by a shutter button. For instance, the shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened" the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more photographs being recorded, regardless of how the shuttering process is triggered or controlled.

The exposure of a captured image may be determined by a combination of the size of the aperture, the brightness of the light entering the aperture, and the length of the shutter cycle (also referred to as the shutter length or the exposure length). Additionally, a digital and/or analog gain may be applied to the image, thereby influencing the exposure. In some embodiments, the term "total exposure length" or "total exposure time" may refer to the shutter length multiplied by the gain for a particular aperture size. Herein, the term "total exposure time," or "TET," should be interpreted as possibly being a shutter length, an exposure time, or any other metric that controls the amount of signal response that results from light reaching the recording surface.

A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured.

Cameras—even analog cameras—may include software to control one or more camera functions and/or settings, such as aperture size, TET, gain, and so on. Additionally, some cameras may include software that digitally processes images during or after these images are captured. While it should be understood that the description above refers to cameras in general, it may be particularly relevant to digital cameras.

As noted previously, digital cameras may be standalone devices or integrated with other devices. As an example, FIG. 1 illustrates the form factor of a digital camera device 100. Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include a rear-facing camera 112. Front-facing camera 104 may be positioned on a side of body 102 typically facing a user while in operation, or on the same side as multi-element display 106. Rear-facing camera 112 may be positioned on a side of body 102 opposite front-facing camera 104. Referring to the cameras as front and rear facing is arbitrary, and digital camera device 100 may include multiple cameras positioned on various sides of body 102.

Multi-element display 106 could represent a cathode ray tube (CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or rear-facing camera 112, or an image that could be captured or was recently captured by either or both of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 may be similarly or differently arranged. Additionally, front-facing camera 104, rear-facing camera 112, or both, may be an array of one or more cameras.

Either or both of front facing camera 104 and rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front facing camera 104 and rear-facing camera 112 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine a TET of an associated camera, or to help in this determination.

Digital camera device 100 could be configured to use multi-element display 106 and either front-facing camera 104 or rear-facing camera 112 to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

As noted above, the functions of digital camera device 100—or another type of digital camera—may be integrated into a computing device, such as a wireless communication device, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

Figure 2:
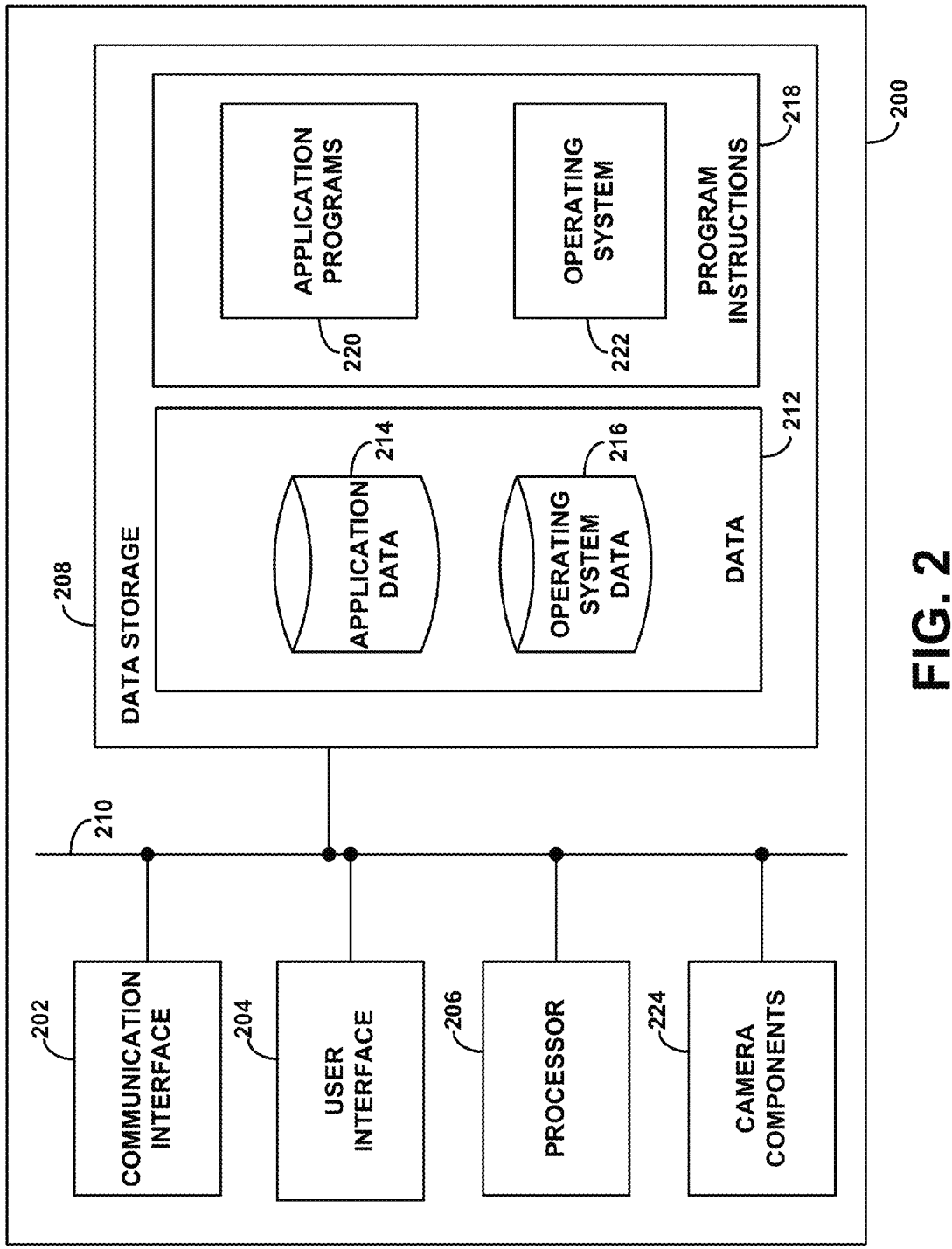
FIG. 2 depicts a block diagram of a computing device with image capture capability, in accordance with an example embodiment.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may function to allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented as functions on a presence-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or functions disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206.

Captured digital images may be represented as a one-dimensional, two-dimensional, or multi-dimensional array of pixels. Each pixel may be represented by one or more values that may encode the respective pixel's color and/or brightness. For example, one possible encoding uses the YCbCr color model (which may also be referred to as the YUV color model). In this color model, the Y color channel may represent the brightness of a pixel, and the Cb (U) and Cr (V) color channels may represent the blue chrominance and red chrominance, respectively, of the pixel. For instance, each of these color channels may take values from 0 to 255 (i.e., the tonal range that a single 8-bit byte can offer). Thus, the brightness of a pixel may be represented by a 0 or a value near zero if the pixel is black or close to black, and by a 255 or a value near 255 if the pixel is white or close to white. However, the value of 255 is a non-limiting reference point, and some implementations may use different maximum values (e.g., 1023, 4095, etc.).

Nonetheless, the YCbCr color model is just one possible color model, and other color models such as a red-green-blue (RGB) color model or a cyan-magenta-yellow-key (CMYK) may be employed with the embodiments herein. Further, the pixels in an image may be represented in various file formats, including raw (uncompressed) formats, or compressed formats such as Joint Photographic Experts Group (JPEG), Portable Network Graphics (PNG), Graphics Interchange Format (GIF), and so on.

Some pixel encodings—including the YCbCr color model—use 8 bits to represent the brightness of each pixel. Doing so is referred to as LDR imaging. As a result, only 256 levels of brightness may be supported. However, real-world scenes often exhibit a wider dynamic range of brightness than can be reasonably represented by LDR imaging. For example, a scene of an individual standing in a dark room in front of a window may include both extremely bright regions and extremely dark regions. However, use of LDR imaging to capture an image of such a scene may result in loss of detail in the bright region and/or the dark region based on the TET with which the image was captured.

A short TET may result in a reasonably accurate representation of the bright regions of a scene, but underexposure of the dark regions. Conversely, a long TET may result in a reasonably accurate representation of the dark regions, but may overexpose the bright regions. In the example scene introduced above, if the TET is too long, the features in the room may appear properly-exposed, but the features outside the window may appear whitewashed. But if the TET is too short, the features outside the window may appear normal but the features in the room may appear darkened. Either of these outcomes is undesirable. For some scenes, there may not be a single TET that results in a captured image representing the details in both bright regions and dark regions with acceptable detail.

Camera devices may support an auto-exposure (AE) mode in which, prior to output image capture, the camera determines the TET based on the brightness of the scene. For example, the user may observe the scene in the camera's viewfinder before triggering image capture. During this period, the camera may make an initial estimate of the proper TET, capture a preview image with that TET, and then evaluate the pixels in the captured image. Then, as one possible implementation, if a majority (or some other sufficient fraction) of the pixels in the preview image are over-exposed, the camera may decrease the TET and capture another preview image. If a majority (or some other sufficient fraction) of the pixels in this preview image are under-exposed, the camera may increase the TET and capture yet another preview image.

For instance, if the majority of the pixels in the captured image exhibit a brightness value above a high threshold level (e.g., 240), the camera may decrease the TET. On the other hand, if a majority of the pixels exhibit a brightness level below a low threshold level (e.g., 96), the camera may increase the TET.

Alternatively or additionally, a target average pixel value for some or all of the scene's pixels may be determined. If the actual average pixel value is above the target average pixel value, the TET may be decreased, and if the actual average pixel value is below the target average pixel value, the TET may be increased. The target average pixel value can also be tuned differently depending on how much contrast there is in the scene. For example, in a low-contrast scene, the target average pixel value may be bright (e.g., 200). But in a high-contrast scene, the target average pixel value may be lower (e.g., 128).

This process may continue until the camera determines that an image should be captured and stored (e.g., the user activates the shutter button). During this process, if the characteristics of the scene are relatively unchanging, the camera usually converges on an estimated "best" TET based on the brightness of the scene. In some embodiments, the image displayed on the camera's viewfinder may omit information from one or more of the captured preview images or combine information from two or more of the captured preview images.

In some cases, the camera might not treat all pixels equally when determining an "average" brightness of the scene. Using a technique described as "center-weighted averaging," pixels near the middle of the scene may be considered to be more important. Thus, these pixels may be weighted more than pixels illustrating other areas of the scene. Alternatively, pixels in other locations of an image may be given more weight. For instance, if the camera detects a human face (or some other object of interest) in a particular location other than the center of the image, the camera may give a higher weight to the associated pixels.

In this way, AE algorithms may seek to determine a TET that produces a large number (e.g., the largest number) of properly-exposed pixels. However, given the range limitations of LDR imaging, even images captured in AE mode may contain portions that are whitewashed or darkened. Thus, as noted above, some scenes there may be no single "best" TET.

AE algorithms may differ from the description above. For instance, some may be more complex, treating different colors differently, considering the spatial and/or structural components of a scene, and/or measuring contrast between regions. The embodiments herein, however, may operate with any AE algorithm now known or developed in the future.

High dynamic range (HDR) imaging has been proposed as a way of compensating for the deficiencies of LDR imaging. In a possible implementation, HDR imaging may involve a camera capturing multiple images of a scene at various TETs, and then digitally processing these captured images to make a single image that contains a reasonable representation of the details in most or all regions of the scene, including those that are very bright and very dark. However, determining TETs for capturing images can be problematic. In particular, difficulty in adjusting TETs for a particular scene has created limitations in HDR imaging. The methods and implementations described herein may provide computational efficiency, robustness to artifacts, and/or enhanced image quality.

In the following, the term "LDR image" may refer to an image captured using LDR imaging, and the term "LDR scene" may refer to a scene that has been determined to be reasonably represented using LDR imaging. Similarly, the term "HDR image" may refer to an image captured using HDR imaging, and the term "HDR scene" may refer to a scene that has been determined to be reasonably represented using HDR imaging. Furthermore, the term "LDR imaging" may be used interchangeably with the term "LDR image acquisition," and the term "HDR imaging" may be used interchangeably with the term "HDR image acquisition."

Figure 3:
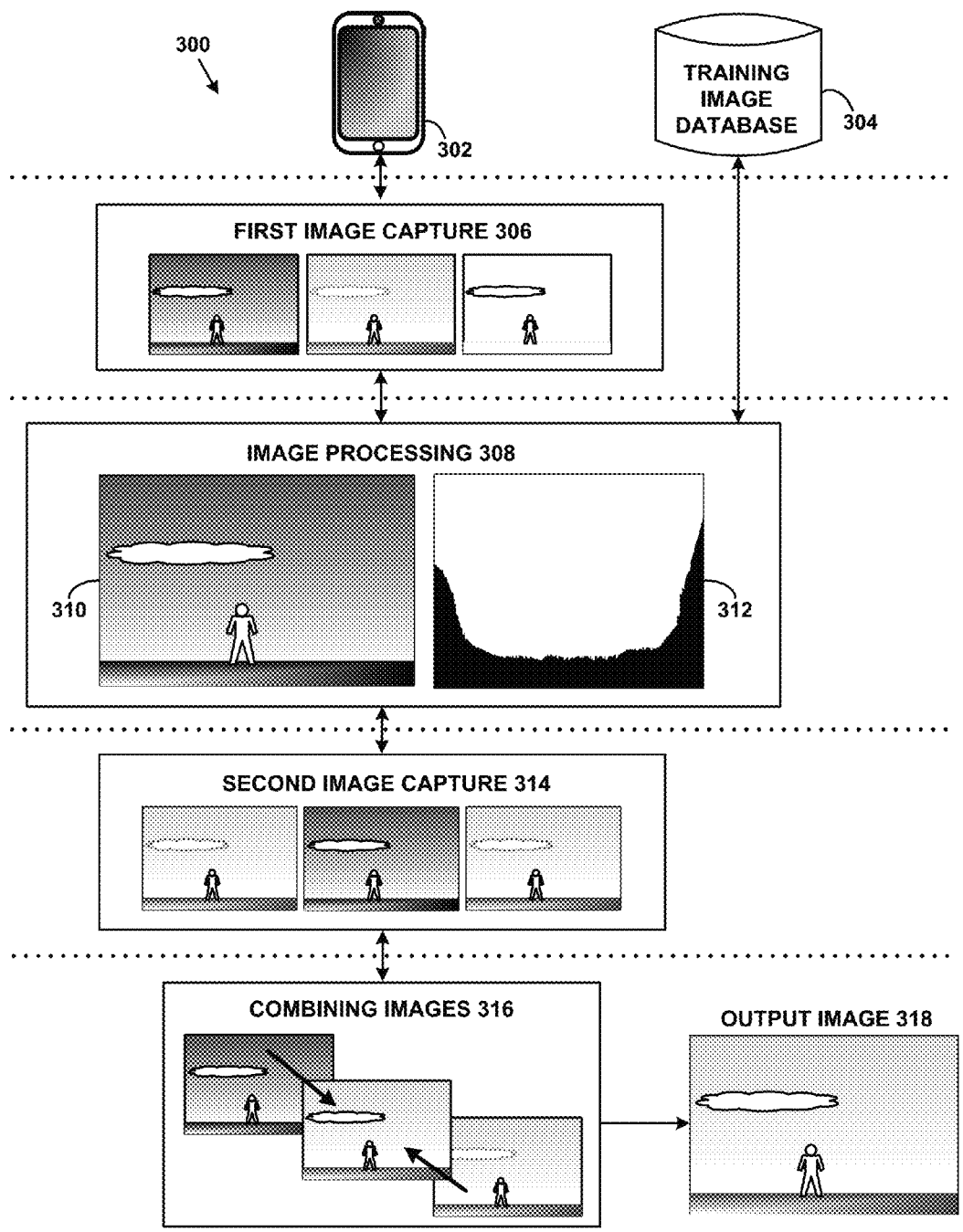
FIG. 3 depicts a flow chart, in accordance with an example embodiment.

FIG. 3 depicts a flow chart, in accordance with an example embodiment. At a high level, flow chart 300 represents an imaging pipeline for a digital camera device 302. For instance, flow chart 300 may represent a number of steps performed by digital camera device 302 to determine whether to use LDR or HDR image acquisition for a particular scene, determine one or more TETs with which to capture images of the scene, and whether and/or how to combine the captured images into an output image that is a reasonably satisfactory representation of the scene. In this way, digital camera device 302 can dynamically adapt to the lighting pattern of the scene, whether that pattern is dark, bright, or some combination of both. Digital camera device 302 may have the same or similar capabilities as digital camera device 100 in FIG. 1.

Flow chart 300 may represent a series of steps performed by digital camera device 302 when a shutter button is triggered. Alternatively or additionally, flow chart 300 may represent steps that are continuously performed when a viewfinder of digital camera device 302 is displaying a representation of a scene. Thus, in some embodiments, the features of flow chart 300 may be performed in a way that is not apparent to the user. For instance, the user may trigger the shutter once, with the intention of capturing a single image. However, digital camera device 302 may capture multiple images in each of first image capture 306 and second image capture 314, and provide an output image 318 that is a combination of one or more images captured during second image capture 314.

It should be noted that not all steps depicted in FIG. 3 need be performed by digital camera device 302. Some steps, such as image processing 308 and combining images 316, for example, could be performed by a different device. For instance, representations of one or more images captured during first image captures 306 and second image capture 314 could be transmitted from a capturing device to a remote computing device. The remote computing device could them perform image processing 308 and combining images 316, possibly transmitting some or all of the results thereof to the capturing device.

Additionally, training image database 304 may be included in digital camera device 302 or alternatively, training image database 304 may be part of a separate device or system that may be accessed by digital camera device 302. In some embodiments, training image database 304 may include representations of training images that can be used to help determine the structure of a payload burst used in second image capture 314.

In first image capture 306, a first group of images of a scene may be captured using a "metering burst sweep." In a metering burst sweep, each image in the group may be captured with a different TET. In some instances, the metering burst sweep may capture consecutive images across a range of TETs (e.g., 1-300 milliseconds, 0.1-500 milliseconds, or some other range). Using such ranges of TETs, the metering burst sweep may capture a series of images with TETs designed to cover this range according to a linear, logarithmic, and/or exponential distribution of TETs, among other possibilities.

As an example, FIG. 3 depicts first image capture 306 including three digital images of a scene, each captured with a different TET. The three images exhibit diverse levels of brightness due to the different TETs used to capture the images. In other examples, more or fewer images may be captured during first image capture 306. These captured images may provide parameters for digital camera device 302 to use when capturing subsequent images of the scene.

The metering burst sweep can be used to determine the characteristics of the scene so that a subsequent payload burst structure for second image capture 314 can be selected. Therefore, in step 308, the images captured at step 306 may be processed. Particularly, step 308 may include merging one or more of the images captured at step 306 in a combined image 310. Step 308 may also include forming a histogram 312 from the merged images, and then using the histogram, and possibly some or all of the information in training image data 304, to classify the scene (e.g., as an LDR scene or an HDR scene), determine the structure of the payload burst based on the classification of the scene, and determine the TETs to use when capturing images according to the payload burst. In some embodiments, the captured images, shown as a result of first image capture 306, may be downsampled prior to merging. Further, the histogram may be an LDR histogram, HDR histogram, a log HDR histogram, or some other form of histogram.

In step 314, the second group of images may be captured. The number of images captured and the arrangement of TETs used to capture these images may be referred to as a "payload burst." For example, in FIG. 3 second image capture 314 includes three images of a scene, each captured with a TET identified in step 308. It should be understood that the TETs identified in step 308 may be the same or different than the TETs used to capture images in step 306. Additionally, it is possible that all three images in second image capture 314 are captured with the same or similar TETs.

In step 316, images from the second group of images may be combined. Combining images may include aligning two or more of the images. In some instances, images may be aligned globally (i.e., aligning whole images as opposed to portions of images), locally (i.e., aligning portions of images perhaps at the pixel block and/or individual pixel level), or possibly both globally and locally. Further, combining two or more images may also include merging them to form an output image 318. This merging may be carried out in accordance with any image fusion technique now known or developed in the future.

Merging the images in the second group of images may result in output image 318 being sharper and/or better-exposed than any of the individual images in the second group. For instance, if some of the images in second image capture 314 are captured with the same or similar TETs, these images may be merged to reduce noise in one or more sections of the images. Alternatively or additionally, if the images in second image capture 314 are captured with two or more different TETs, at least some images with different exposure times may be merged according to HDR procedures. Regardless, the output image may be stored on a computer-readable medium and/or displayed on an output medium such as the multi-element display 106 of FIG. 1.

In some embodiments, the arrangements of various possible payload burst structures may be determined based on the TETs determined in step 308, as well as an understanding of combining images step 316. While numerous arrangements of payload burst structures may be possible, three examples are described herein.

TABLE 1

| Scene Type | Payload Burst Structure |
|---|---|
| LDR | T T T T |
| HDR | L S L L S L L S L L |
| HDR (with fallback) | L S L L S L L F F F |

Table 1 illustrates these examples. In the first example, the scene type is LDR. In this example, the payload burst structure includes four images captured sequentially, and may be referred to as an "LDR burst structure." Each "T" in the Payload Burst Structure column of Table 1 may represent a captured image. Each of these images may be captured using the same or a similar TET that was determined in step 308. In some embodiments, fewer or more images may be captured in an LDR payload burst. For example, as few as one, or as many as ten or more images may be included.

Regardless of the number of images captured, some of these images may be aligned and combined in step 316. For instance, if m images are captured in the payload burst, the sharpest one of these images may be selected as a "primary image," and the remaining m−1 images may be considered "secondary images." In some implementations, the sharpness of an image may be measured by the image's resolution and/or boundaries between zones of different tones and/or colors in the image. Alternatively or additionally, other sharpness measurements may be used.

Further, zero or more of the m−1 secondary images may then be aligned and merged with the sharpest image. For instance, alignment may be attempted between each of the secondary images and the sharpest image, respectively. If the alignment fails for parts of a respective secondary image, those parts may be discarded, and not combined with the primary image. In this way, the sharpest image may be de-noised with information from some or all of the secondary images.

In the second example, the scene type is HDR. In this example, the payload burst structure includes ten images captured according to a pattern of long and short TETs, and may be referred to as an "HDR burst structure." In the Payload Burst Structure column of Table 1, each "L" may represent an image captured with the long TET, each "S" may represent an image captured with the short TET. Thus, the pattern of "L S L L S L L S L L" may indicate that the first image of the payload burst is captured using the long TET, the second image is captured using the short TET, the third and fourth images are captured using the long TET, the fifth image is captured using the short TET, the sixth and seventh images are captured using the long TET, the eighth image is captured using the short TET, the ninth image is captured using the long TET, and the tenth image is captured using the long TET.

The long and short TETs may be determined based on the results of image processing 308. Thus, the long and short TETs may be selected so that the resulting images captured with these TETs can be combined using HDR procedures. The long TET may be used to capture the details in dark sections of the scene, while the short TET may be used to capture the details in bright sections of the scene.

Examples of short TET values may include TETs of 1 millisecond, 2 milliseconds, and/or 8 milliseconds, while examples of long TET values may include TETs of 20 milliseconds, 40 milliseconds, and/or 80 milliseconds. However, short and long TETs may take on different values.

Despite the payload burst in the second example having a particular structure in Table 1, other structures may be used. For example, payload burst structures of "L S L S L S L S L S" or "L L S L L S L L S L" could potentially provide suitable patterns of long and short TETs. Further, some payload burst structures may include fallback TETs (denoted by an "F"). Thus, additional example payload bursts may include "S F L L L S F L L L" or "S F L S F L S F L L" structures.

In some embodiments, a payload burst structure may include more or fewer than ten images. Generally speaking, the determining the length of the payload burst structure involves a tradeoff. On one hand, a long payload burst (i.e., a payload burst with a large number of image captures) is desirable because the likelihood of one or more of the captured image being well-exposed and sharp is increased. On the other hand, if the payload burst is too long, the likelihood of ghosting due to movement in the scene is also increased. Additionally, darker scenes may benefit from images captured using a longer TET, so that more light can reach the recording surface. Therefore, the payload burst structure may be based, possibly in part, on these considerations.

In the third example, the scene type is also HDR. However, in this example, the associated payload burst structure (which also may be referred to as an HDR burst structure) includes seven images captured according to a pattern of long and short TETs, followed by three fallback TETs. Each "F" may represent an image captured with the fallback TET, and the fallback TET may take on a value different from both the long and short TETs.

Regardless of the type of payload burst structure, the images of an HDR scene may be aligned and combined. Images captured using the short TET may be referred to as "short images" for convenience, and images captured with the long TET may be referred to as "long images" for convenience.

In some embodiments, the sharpest short image may be selected, from the short images, as the primary short image. Zero or more of the remaining secondary short images may then be aligned and merged with the primary short image. For instance, alignment may be attempted between each of the secondary short images and the primary short image, respectively. If the alignment fails for parts of the respective secondary short image, those parts may be discarded, and not combined with the primary short image. In this way, the sharpest short image may be de-noised with information from some of the secondary short images.

The same or a similar process may be undertaken for the long images. For example, the sharpest long image may be selected, from the long images, as the primary long image. Zero or more of the remaining secondary long images may then be aligned and merged with the primary long image. Alignment may be attempted between each of the secondary long images and the primary long image, respectively. If the alignment fails for parts of the respective secondary long image, those parts may be discarded, and not combined with the primary long image.

The resulting combined short image (e.g., the sharpest short image possibly de-noised by information from zero or more secondary short images) and the resulting combined long image (e.g., the sharpest long image possibly de-noised by information from zero or more secondary long images) may then be aligned. If the alignment succeeds, these two images (e.g., both LDR images) may be combined according to HDR procedures. For instance, they may be combined into an HDR image, and the HDR image may then be tonemapped so that its brightness falls within a range commensurate with the display abilities of convention video output devices (e.g., pixel values between 0 and 255, inclusive). The resulting tonemapped HDR image may be designated as output image 318. In some embodiments, if the signal-to-noise ratio of part or all of output image 318 is still lower than a threshold value, a de-noising procedure may be applied to further reduce noise. Additionally, output image 318 may also be sharpened, possibly after applying the de-noising procedure. In general, various types of HDR fusion algorithms, such as Exposure Fusion or Local Laplacian Filters, may be used to merge short and long images. If fallback TETs are used in the payload burst structure, these HDR fusion algorithms may be applied to one or more fallback images as well.

If the alignment fails between the combined short image and the combined long image, then the HDR processing fails. However, if fallback images were captured, one or more of the fallback images may be used to form output image 318. For instance, the sharpest fallback image may be selected. Zero or more of the remaining secondary fallback images may be aligned and combined with the sharpest fallback image carried out in a similar fashion as the processes described above for the short and long images. For payload burst structures without fallback images in which alignment fails, the combined long or short image may be used to form output image 318.

Generally speaking, image alignment may involve computational methods for arranging two or more images over one another so that they "match." Once the images are aligned, various functions can be performed, such as image enhancement (e.g., noise reduction), image stabilization (e.g., to compensate for the shaking of a video camera), pattern matching (e.g., identification of common elements in two or more images), and object recognition (e.g., finding a specific object in two or more images), as well as other functions.

Given the various uses of image alignment, it is advantageous to be able to perform image alignment in an efficient and robust fashion. In practice, a global alignment (i.e., translating the whole image by a number of pixels on the x-axis and by a potentially different number of pixels on the y-axis) may be performed. Alternatively, instead of or in addition to aligning the whole image according to these x and y offsets, it may be advantageous to break the image into a number of smaller tiles, where each tile is an i×j pixel block, and align these tiles separately according to respective individual offsets. The size of each tile may be as small as a 1×1 pixel block (i.e., one pixel). The result the alignment might include some tiles being offset differently than others.

Numerous image alignment techniques may be used with the embodiments herein. For instance, one possible option is to use optical flow, which performs both global (e.g., image level) alignment and local (e.g., tile level and/or pixel level) alignment. Other techniques include using affine transforms or homography for global alignment, followed by any type of local alignment. An affine transform may result in one of the images being shifted, scaled, and rotated as it is aligned to the other image. A homography transform may result in one of the images being shifted, scaled, rotated, and warped as it is aligned to the other image. The local alignment may involve using row and/or column sums, Fourier transforms, brute force, or other techniques to refine the global alignment.

Figure 4:
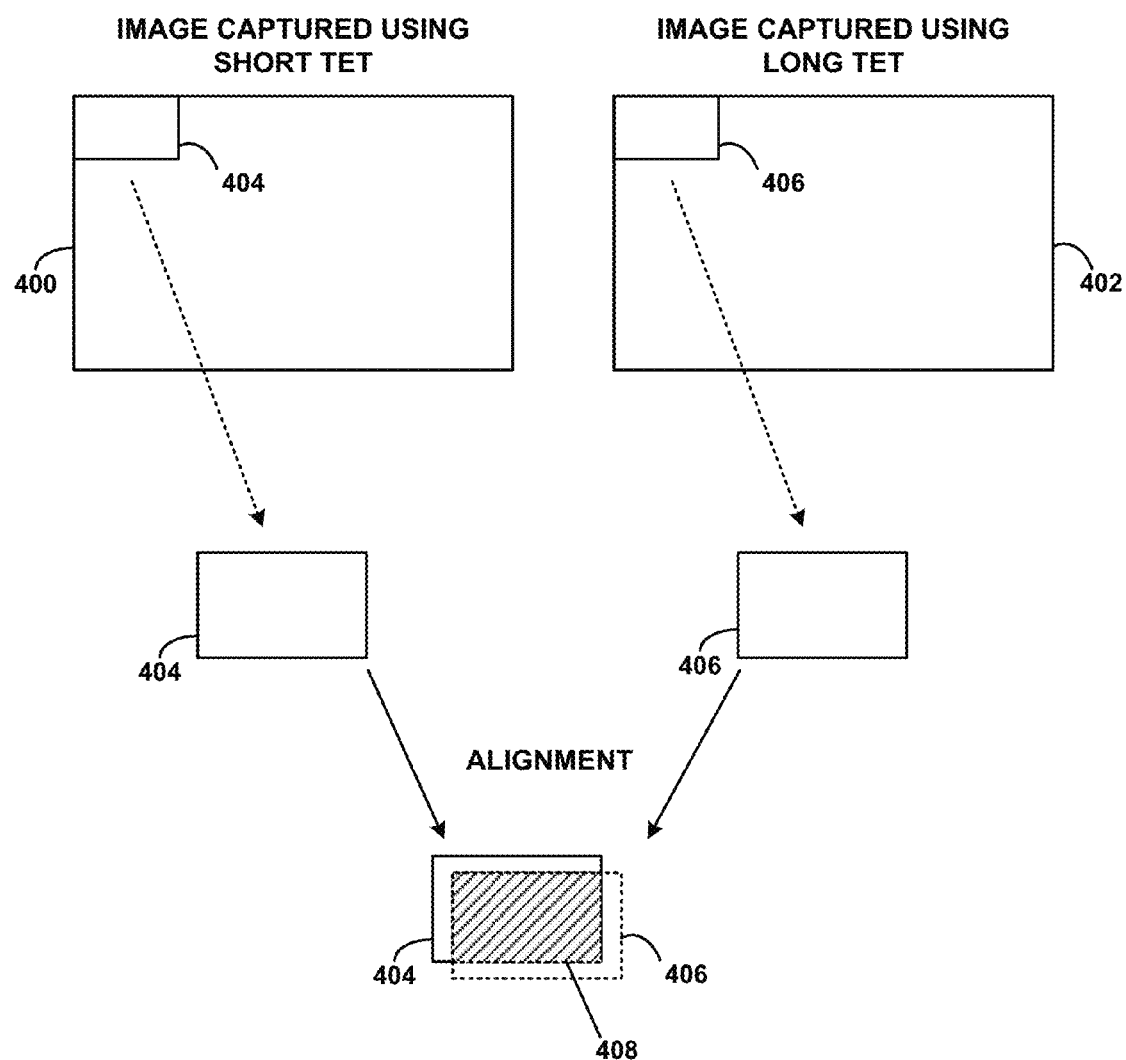
FIG. 4 depicts image alignment, in accordance with an example embodiment.

FIG. 4 depicts an example alignment of a short TET image 400 ("short image 400") and a long TET image 402 ("long image 402"). Short image 400 may be a combined short image, and/or long image 402 may be a combined long image. Short image 400 and long image 402 may have been captured, perhaps during second image capture 314, as part of a payload burst of images of a scene. Alternatively, the example alignment depicted in FIG. 4 may be between two or more images captured with a similar or identical TET. For instance, all images may have been captured using a short TET, a long TET, or some other TET.

Optionally, short image 400 and long image 402 may be divided into i×j pixel tiles, and associated pair of tiles may be aligned with one another. For instance, tile 404 from the upper left hand corner of short image 400 and tile 406 from the upper left hand corner of long image 402 may be selected for alignment with one another. As shown in FIG. 4, either tile 404 or tile 406 may be shifted vertically or horizontally during the alignment process. This shifting may occur due to movement in the scene or movement of the camera device between when short image 400 and long image 402 are captured. Nonetheless, the resulting overlap area 408 between short image 400 and long image 402 may encompass only subsets of each image. The illustrated procedure of aligning individual tiles may be repeated for all pairs of tiles in short image 400 and long image 402.

Alternatively, overlap area 408 may encompass more than just a tile of short image 400 or long image 402. For instance, tile 404 may be selected from short image 400. Then, tile 404 may be "slid" around and/or placed in a series of locations in long image 402 until a sufficient match between the contents of tile 404 and a corresponding region of long image 402 is found. Then, a pixel by pixel pairwise alignment of tile 404 with this region may be performed.

As part of the alignment process, various checks may be performed to determine the accuracy of the alignment. If these checks indicate that the alignment is reasonably accurate (e.g., one or more values that measure alignment error are within pre-determined tolerances), then the images may be merged according to the alignments of each pair of tiles. As noted above, the merging process may use various types of HDR fusion algorithms, such as Exposure Fusion and/or Local Laplacian Filters.

One or more of these possible checks may include comparing the brightness and/or color values of corresponding pixels of tile 404 and tile 406 with a noise model for the image sensor and/or camera device that captured short image 400 and long image 402. Such a noise model may characterize a degree of noise associated with characteristics of the pixels to be merged. These checks may be performed to improve pixel alignments, and/or avoid using computational time and resources in attempts to align pixels that are a bad match with one another.

For instance, suppose that a first pixel in tile 404 is a candidate for merging with a second pixel from tile 406. The first pixel may exhibit a number of characteristics, such as a particular color temperature (which may be referred to as an effective color temperature), a particular brightness, and one or more particular color values. Further, a particular gain applied to the first pixel. A set of one or more of these characteristics may be mapped to a noise deviation. The noise deviation may characterize an extent of error (Gaussian or otherwise) that may be introduced by the image sensor and/or the camera device given that the first pixel exhibits the particular color temperature, gain, brightness, and/or color values. For instance, a particular image sensor may introduce more noise when capturing images of a scene at a low level of brightness, but introduce less noise when capturing the images of the same scene at a high level of brightness.

Thus, the brightness of the first pixel plus and minus the noise deviation may define a range of brightness values in which other pixels captured by the same image sensor and/or the camera device and exhibiting the same particular color temperature, gain, and/or color values should fall. For example, the noise deviation may be a standard deviation of a noise distribution. If the noise distribution is Gaussian, then approximately 68% of the brightness values of the other pixels are expected to be within one noise deviation of the particular brightness, approximately 95% of the brightness values of the other pixels are expected to be within two noise deviations of the particular brightness, and approximately 99% of the brightness values of the other pixels are expected to be within three noise deviations of the particular brightness.

A noise model for a given image sensor and/or camera device may be calibrated manually. For example, the given image sensor and/or camera device may be used to capture a number of images in a controlled-lighting environment, and the noise model may be inferred from these images. Many different colors may be captured under many different gain, color temperature, and white balance settings, so that a sufficient extent of YUV values (or RGB or CMYK values), gains, color temperatures, and white balances are represented. Based on this data, the mappings (e.g., mappings 506, 508, 510, and 512 of FIGS. 5A and 5B) may be created. Alternatively, if the processing steps of the image sensor and/or camera device that result in particular YUV values are known, a noise model for the image sensor and/or camera device may be derived analytically.

A particular noise model may be configured so that the noise deviations therein represent a particular percentage of brightness values. For instance, the particular noise model may be arranged such that one noise deviation above and/or below the particular brightness is expected to include 55%, 70%, 85% or some other percentage of the brightness values of any pixel captured by the same image sensor and/or the camera device and exhibiting the same particular color temperature, gain, and/or color values.

A decision of whether or not to merge two pixels and/or their associated tiles may be made using a noise model. For instance, the first pixel in tile 404 may exhibit a particular brightness value, and a noise deviation for this brightness may be determined. If the brightness value of the second pixel in tile 406 falls within the range defined by the particular brightness value and the noise deviation, then the two brightness values are consistent with one another given the tolerance specified by the noise model. Thus, the two pixels may be merged.

On the other hand, if the brightness value of the second pixel does not fall within the range, then the two brightness values are not consistent with one another given the tolerance specified by the noise model. In that case, the two pixels might not be merged. Consequently, one of the pixels and/or the tile which includes the pixel may be omitted from any resulting output image.

Alternatively or additionally, the mappings may include a noise deviation of one or more other color channels. In some embodiments, the mappings may provide multiple noise deviations, potentially one for each color channel.

Figure 5A:
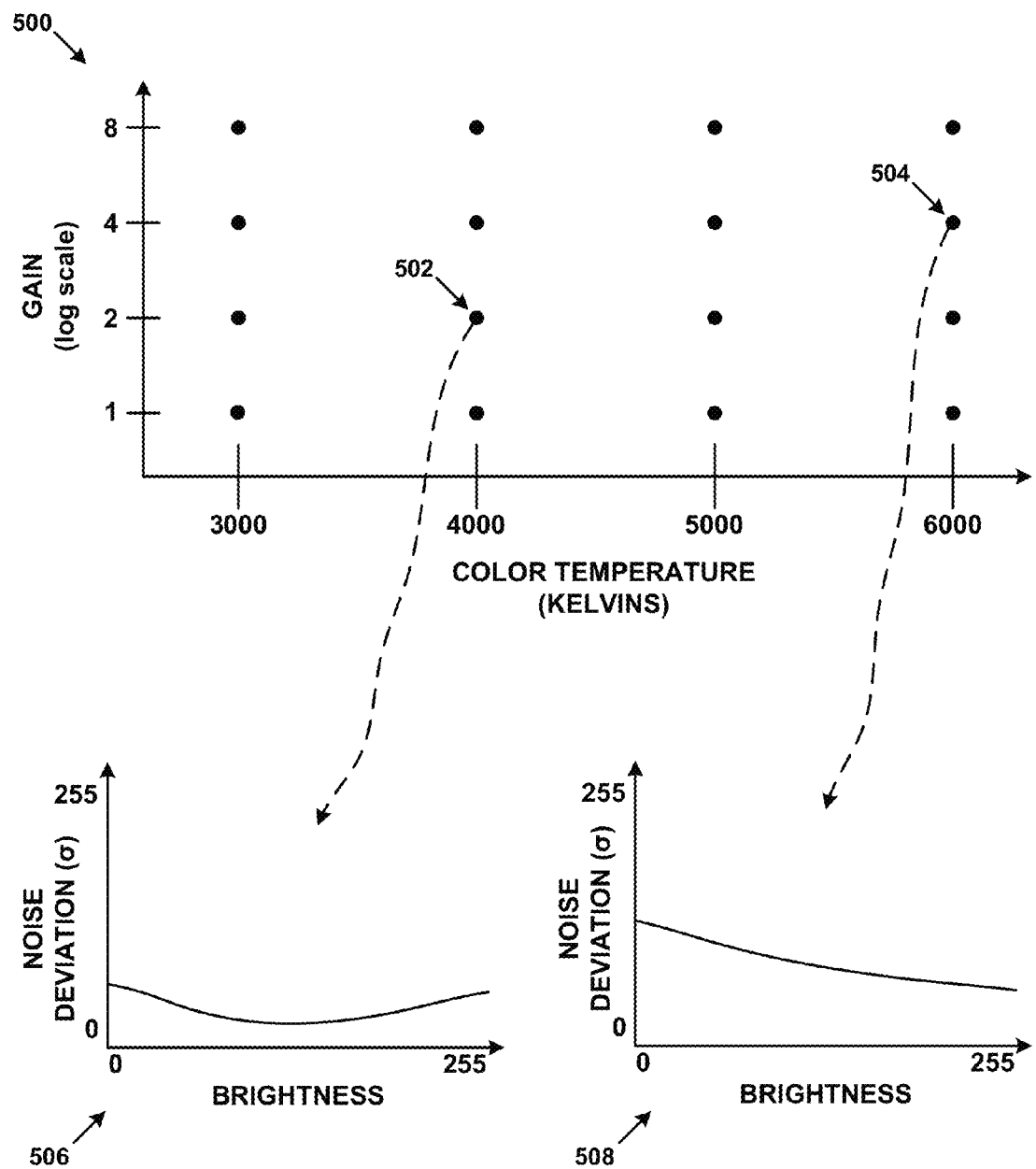
FIG. 5A depicts mapping pixel characteristics to a noise deviation, in accordance with an example embodiment.

FIG. 5A depicts a possible way of associating a pixel's color temperature and gain to a mapping from the pixel's brightness and to a noise deviation. Chart 500 is a two-dimensional graph with color temperature on the x-axis and gain on the y-axis. Each defined combination of a particular color temperature and a particular gain may be associated with a particular mapping. For example, point 502 on chart 500 associates a color temperature of 4000 degrees kelvins and a gain of 2 with mapping 506. Similarly, point 504 associates a color temperature of 6000 degrees kelvin and a gain of 4 with mapping 508. In some embodiments, chart 500 may be a three-dimensional graph that associates particular color temperatures, particular gains, and particular white balances with mappings.

The color temperature of a pixel may refer to the temperature of an ideal black-body radiator that would radiate light of a color comparable to that of the pixel. Color temperatures are typically measured in kelvins, though other units of temperature may be used. Color temperatures over 5000 degrees kelvin may be referred to as "cool" colors due to their blue-white appearance. Lower color temperatures, such as those between 2700 and 3000 degrees kelvin, may be referred to as "warm" colors due to their yellow, orange, or red appearance. In some embodiments, a plurality or all pixels of a particular image may exhibit the same or a similar color temperature.

The gain applied to a pixel may be an analog gain (e.g., applied during image capture), a digital gain (e.g., applied by a computing device after image capture), or a combination of analog gain and digital gain. In the case of both analog and digital gain being applied, the gain on the y axis of chart 500 may be a total gain represented by the product of the analog and digital gains.

White balance may refer to an adjustment used to maintain the integrity of neutral colors, such as blacks, grays, and whites. For instance, when capturing images of a scene, some image sensors may represent the scene using colors that do not match the actual colors of the scene. For instance, a captured image of a white scene may appear tinted with, e.g., blue, orange or green coloring. White balance applies processing to the captured image in order to adjust the captured image to be closer to what the human eye might perceive when viewing the scene. In some cases, this processing may include applying one or more offsets to the color channels of pixels in the captured image.

Chart 500 illustrates 16 discrete points that associate different color temperatures and gains with different mappings. In some embodiments, more or fewer mappings may be used. Furthermore, the range of color temperatures and/or gains may be different.

In situations where the particular color temperature of a pixel and the particular gain applied to the pixel does not match one of the discrete points, a nearby point may be selected. For instance, a discrete point in chart 500 defined by a target color temperature and a target gain may be selected. The target gain may be higher than the particular gain and the target color temperature may be a closest color temperature to the particular color temperature.

Selecting a target gain that is higher than the particular gain may result in a mapping exhibiting larger noise deviations, because applying a higher gain to a pixel tends to introduce more noise. Such a higher target gain may be selected in order to make it more likely that the brightness of associated pixels in alternate images will fall within the range defined by the particular brightness and the noise deviation. If a more conservative approach is desirable, a target gain that is lower than the particular gain may be selected.

Alternatively, other methods of interpolating or extrapolating the particular brightness and particular gain to one of the discrete points may be used (e.g., linear interpolation). In some embodiments, chart 500 may be implemented as a lookup table indexed by a color temperature and a gain, or a function that takes a color temperature and a gain as input and provides a reference to a mapping as output.

Mappings 506 and 508 map from brightnesses to noise deviations (denoted as σ). Thus, for instance, mapping 506 depicts a relationship between brightness and noise deviation where noise deviation is greater for low and high brightnesses and lesser for mid-level brightnesses. On the other hand, mapping 508 depicts a relationship between brightness and noise deviation where noise deviation decreases as brightness grows.

Regardless, mappings 506 and 508 are merely example mappings, and other mappings may represent different relationships between brightness and noise deviation. Additionally, the range of values for both brightness and noise deviation in mappings 506 and 508 are from 0 to 255. These ranges are commensurate with the use of LDR imaging. However, other ranges of values may be used, including ranges that explicitly support HDR imaging. Not unlike chart 500, either or both of mappings 506 and 508 may be implemented as a lookup table indexed by a brightness, or a function that takes a brightness as input and provides a noise deviation as output. The input brightness might be a linear brightness value or a tonemapped brightness value.

Figure 5B:
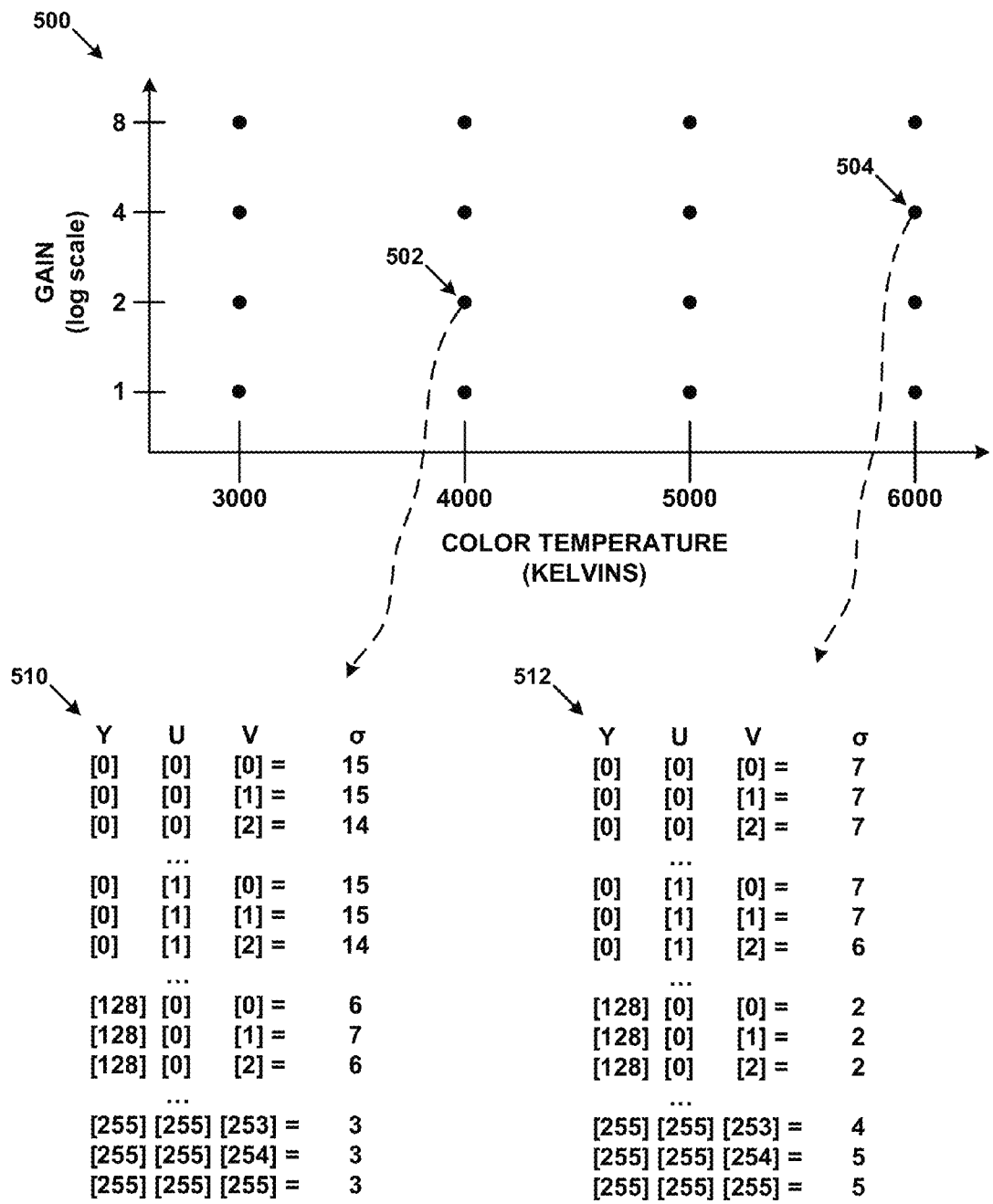
FIG. 5B also depicts mapping pixel characteristics to a noise deviation, in accordance with an example embodiment.

FIG. 5B depicts a possible way of associating a pixel's color temperature and gain to a mapping from the pixel's color values to a noise deviation. In FIG. 5B, chart 500 is used to select a mapping between the three channels of the YUV color model (recall that the Y channel represents brightness, and the U and V channels represent blue and red chrominance, respectively) and noise deviations. In some embodiments, instead of the YUV color model, another color model, such as the RGB color model, may be used. Alternatively, only one or two color channels may be used as input. Regardless, unlike the mappings of FIG. 5A, the mappings of FIG. 5B include color values other than brightness as input.

In particular, mappings 510 and 512 depict respective three-dimensional lookup tables. These tables are indexed by the Y, U, and V channels, and provide a noise deviation as output. While mappings 510 and 512 each include $256^3$ possible associations from Y, U, and V values to noise deviations, more or fewer associations may be used. For instance, the Y, U, and V color values may be within a range other than 0-255. Alternatively or additionally, the $256^3$ possible associations of mappings 510 and 512 may be binned, or otherwise combined, into fewer associations. For instance, $16^3$ possible associations may be used instead. In some embodiments, a noise deviation for more than one color channel may be produced. For instance, a noise deviation for each of the Y, U, and V color channels (and/or the R, G, and B color channels) may be produced.

Given a particular noise deviation, one or more determinations may be made of whether to merge two or more pixels based on the brightness of the pixels and a noise deviation. This process is illustrated in FIG. 6.

Figure 6:
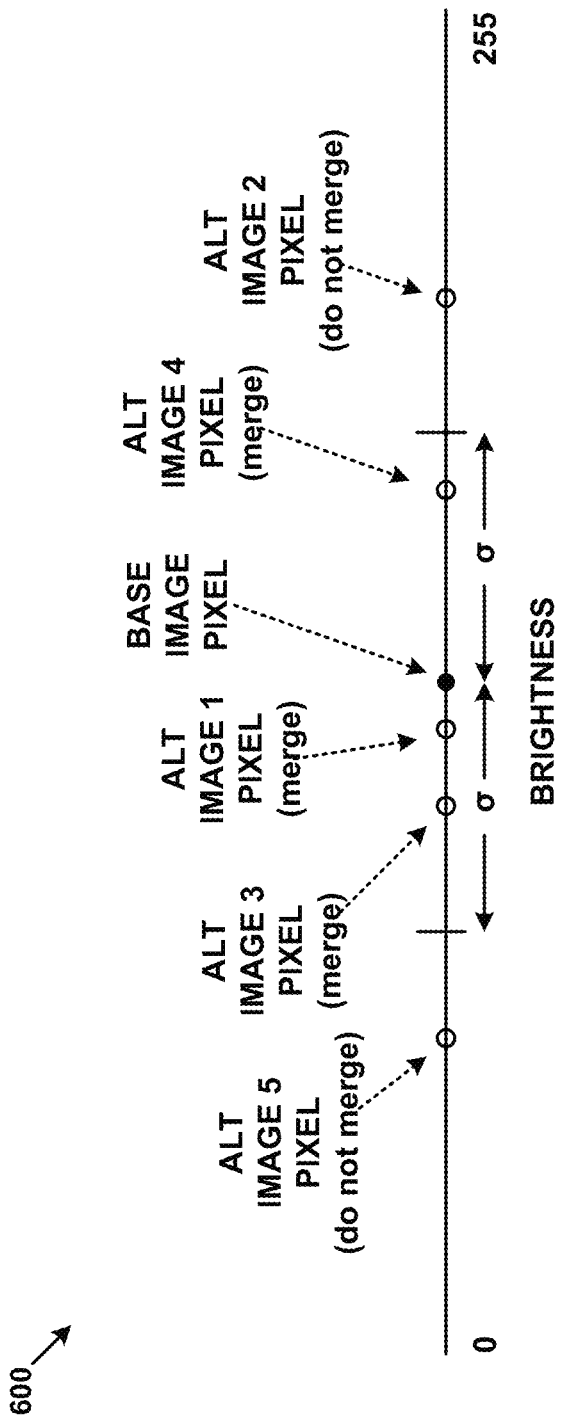
FIG. 6 depicts using a noise deviation to determine whether to merge pixels, in accordance with an example embodiment.

Scale 600 of FIG. 6 depicts a comparison of a base image with five alternate ("alt") images, alt image 1, alt image 2, alt image 3, alt image 4, and alt image 5. The base image and the five alternate images may be images of a particular scene, and may have been captured during an image capture sweep, such as second image capture 314. These images may have been aligned with one another—for instance, each of the alt images may have been aligned with the base image. The base image may have been selected due to being the sharpest image, or one of the sharpest images, of the image capture sweep. Each alternate image may be considered a candidate for merging with the base image, possible in order to de-noise or further sharpen the base image.

Thus, for a particular tile of the base image, a representative tile of each alternate image may be selected. This selection may occur in accordance with the image alignment procedures discussed in the context of FIG. 4. For a given pixel of the base image, corresponding aligned pixels from each of the alternate images may be identified. The color temperature and the gain associated with the base image pixel may be determined. These values may be used with chart 500 to select a mapping between brightness (and possibly one or more color values) and noise deviation. For instance, mapping 502, mapping 506, mapping 510, mapping 512 or some other mapping may be selected. Then, using the selected mapping, the brightness of the base image pixel may be mapped to a noise deviation, σ.

As shown on scale 600, a range defined by the brightness of the base image pixel minus σ to the brightness of the base image pixel plus σ may be identified. Alternatively, other defined ranges such as the brightness of the base image pixel minus 2σ to the brightness of the base image pixel plus 2σ, or the brightness of the base image pixel minus 3σ to the brightness of the base image pixel plus 3σ may be used.

The corresponding aligned pixels from the alternate images that have brightness values within the defined range may be merged with the base image pixel. However, the corresponding aligned pixels from the alternate images that have brightness values outside of the defined range might not be merged with the base image pixel. Thus, in FIG. 6, the base image pixel, alt image pixel 1, alt image pixel 3, and alt image pixel 4 may be merged. Alt image pixel 2 and alt image pixel 5 might not be merged with the base image pixel. This process may also be used with one or more additional pixels in the same tile, as well as for some or all pixels in other tiles of the base image.

Alternatively, for a given tile in the base image, the average brightness value over all pixels in the tile may be determined, and this average brightness value may be used as input to the selected mapping. The resulting noise deviation may be applied to all pixels in the tile. This embodiment may be used to reduce the computational resources used by the techniques described herein.

One possible advantage of the procedure illustrated by FIGS. 4-6 is that it can be used to check the quality of an image alignment before pixels from the aligned images are merged. If corresponding pixels from two or more images are to be merged, it is desirable for those pixels to have approximately the same brightness values. If this is not the case, then it is likely that the alignment of the image (or tiles or pixels within the images) has failed. The parameterized noise model described herein may provide a range of acceptable error for these brightness values based on the characteristics of individual image sensors and/or camera devices. Thus, alternative pixels with values outside of this range of acceptable error are likely to be poorly aligned with the base image pixel, and may be omitted from the merging process. Thus, the quality of the merged image (e.g., output image 318) may be potentially improved.

An additional tile-level check may be applied before two images are merged. For instance, a base image tile from the base image may have been aligned with an alternate image tile from an alternate image. The RMS difference of these two tiles may be calculated. The RMS average of n values may be obtained as:

$$RMS = \sqrt{\frac{x_1^2 + x_2^2 + \ldots + x_n^2}{n}}$$

To determine the RMS difference of the two tiles, the squared difference between each pair of aligned pixels (one from the base image tile and another from the alternate image tile) may be calculated. The average of these squared differences is the RMS difference. The RMS difference may be compared to a threshold. The threshold may be constant, or based on the noise deviation of a noise model. If the RMS difference is greater than the threshold, then no pixels from the alternative image tile are merged into the base image. Thus, the alternate image tile as a whole may be discarded based on the outcome of this check. In some embodiments, a higher order mean difference may be taken. For instance, each value of x may be raised to the third power, averaged, and then the cube root of this average may be taken. In other embodiments, each value of x may be raised to a power less than 2, such as 0.5, 1, or 1.5.

Yet another check may be applied at the tile level. Again considering a base image tile from the base image that was aligned with an alternate image tile from an alternate image, the average value for each color channel across all pixels in the base image tile may be determined. These values may be compared to the average value for each color channel across all pixels in the alternate image tile. If these average values differ from one another by more than a threshold value (e.g., more than 1%, 2%, 5%, etc.), then no pixels from the alternative images tile are merged into the base image tile and the alternate image tile as a whole may be discarded.

Both of these tile level checks may be able to identify tile-level alignment errors that the noise model checks might not detect. Also, any of the tile-level checks can be performed on overlapping tiles in order to provide an even greater extent of error checking.

With respect to pixel-level alignment, these alignments may only be correct to within half a pixel. For instance, if there is a sharp edge in a tile, the alignment may be off by half a pixel in any direction. When the difference of pixels along the edge is determined and squared, the resulting error may be quite large, even if the alignment is ideal.

One possible solution is to align the base image tile and the alternate image tile to the sub-pixel level. However, this might involve resampling the base image, the alternate image or both. Such a re-sampled image may be blurred, and the sub-pixel registration process can be computationally expensive.

Another solution is to tolerate misalignment by up to half a pixel, and treat that degree of misalignment as having little or no error. To achieve this, instead of just testing whether a pixel from the alternate image tile is within a range defined by a pixel value from the base image tile, the procedure of Table 2 may be used to determine whether the values of the pixels fall within a sub-pixel forgiveness range.

TABLE 2

1. For each base image pixel, b[i,j]:
2.     Let min5 be the minimum pixel value among b[i,j] and its 4 immediate neighbors
3.     Let max5 be the maximum pixel value among b[i,j] and its 4 immediate neighbors
4.     Let min[i,j] = lerp(b[i,j] pixel value, min5, 0.5)
5.     Let max[i,j] = lerp(b[i,j] pixel value, max5, 0.5)
6. For each aligned alternate image:
7.     For each alternate pixel, a[i,j]:
8.         if a[i,j] is within the range min[i,j]..max[i,j] then the error of a[i,j] is 0
9.         else the error of a[i,j] is the distance outside of the range Line 1 of Table 2 iterates through each base image pixel, b[i,j], in the base image tile. At line 2, min5 is set to the minimum pixel value of b[i,j] and its four immediate neighboring pixels (up, down, left, and right). Similarly, at line 3, max5 is set to the maximum pixel value of b[i,j] and its four immediate neighboring pixels.

At line 4, min[i,j] is set to a linearly interpolated value, determined by a lerp( ) function, between the pixel value of b[i,j] and min5. Also, at line 5, max[i,j] is set to a linearly interpolated value, determined by the lerp( ) function, between the pixel value of b[i,j] and max5. The third parameter of 0.5 to the lerp( ) function indicates that this interpolated value should be half way between the pixel value of b[i,j] and min5. However, any value between 0.0 and 1.0 could be used as the third parameter. For instance, a value of 0.7 may be used to increase the range of values defined by min[i,j] and max[i,j].

Line 6 of Table 2 iterates through each aligned alternate image, and line 7 iterates through each alternate pixel a[i,j] in a particular alternate image. Lines 8 and 9 determine whether a[i,j] is within the range defined by min[i,j] and max[i,j]. If this is the case, then the error of a[i,j] is 0, otherwise the error of a[i,j] is the distance that a[i,j] is outside of this range. In this way, sub-pixel alignment errors are forgiven when determining whether to merge the base image pixel and the alternate image pixel.

Figure 7:
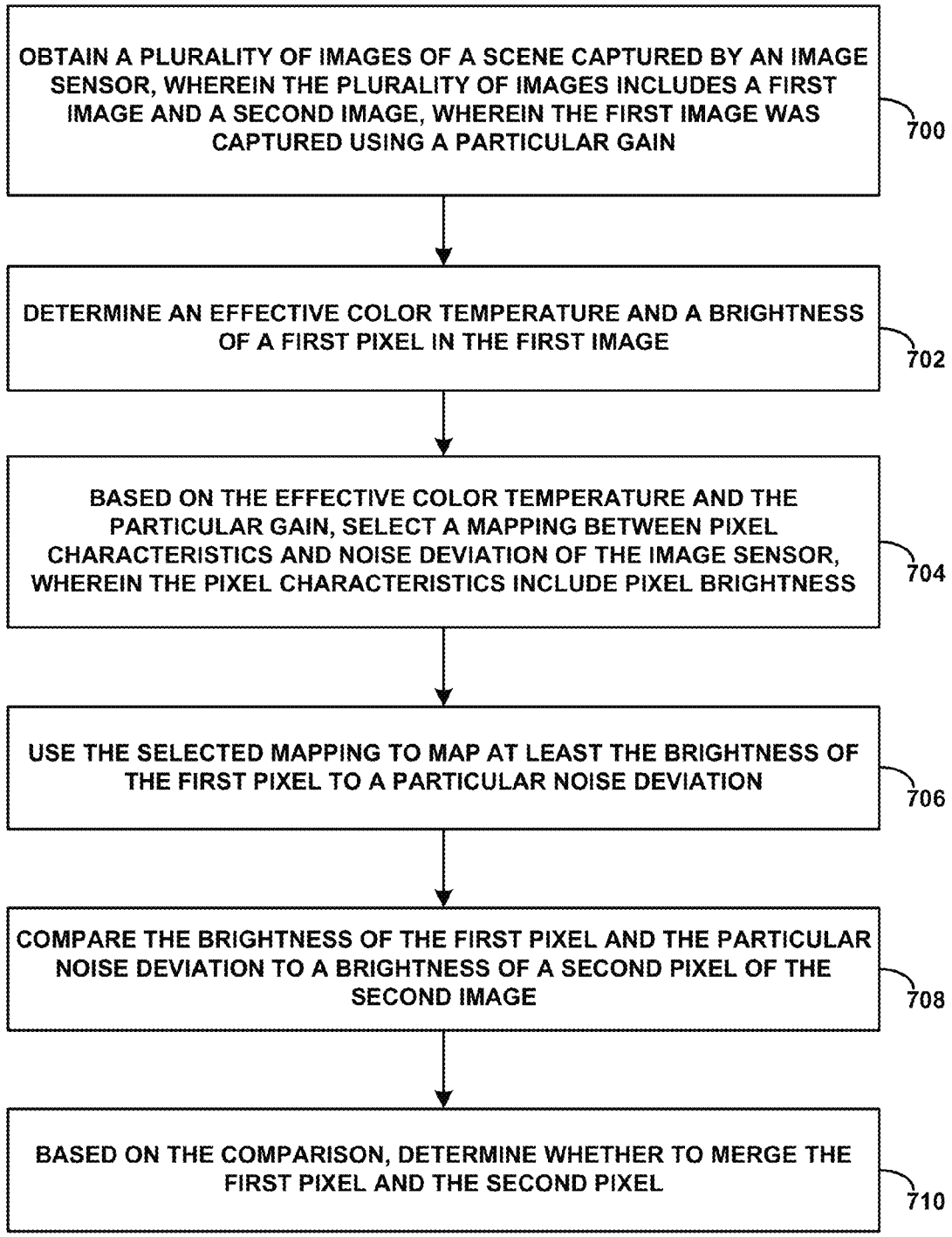
FIG. 7 is a flow chart, in accordance with an example embodiment.

FIG. 7 depicts a flow chart, in accordance with an example embodiment. At step 700, a plurality of images of a scene may be obtained. The plurality of images may have been captured by an image sensor, and may include a first image and a second image. The first image may have been captured using a particular gain. At least two images of the plurality of images may be captured using different TET.

At step 702, an effective color temperature and a brightness of a first pixel in the first image may be determined. At step 704, possibly based on the effective color temperature and the particular gain, a mapping between pixel characteristics and noise deviation of the image sensor may be selected. The pixel characteristics may include pixel brightness.

At step 706, the selected mapping may be used to map at least the brightness of the first pixel to a particular noise deviation. At step 708, a brightness of the first pixel and the particular noise deviation may be compared to a brightness of a second pixel of the second image. At step 710, possibly based on the comparison, it may be determined whether to merge the first pixel and the second pixel.

In some embodiments, comparing the brightness of the first pixel and the particular noise deviation to the brightness of the second pixel may involve determining that the brightness of the second pixel is within a defined range of the brightness of the first pixel, wherein the defined range is based on the particular noise deviation. Based on the brightness of the second pixel being within the defined range, the first pixel and the second pixel may be merged. Merging the first pixel and the second pixel may involve adding the brightness of the first pixel and the brightness of the second pixel to provide a pixel value sum, and dividing the pixel value sum by two.

The defined range may be configured such that the brightness of the second pixel is within the defined range when the first pixel and the second pixel are subject to a sub-pixel alignment error. For instance, the range may be defined using the technique illustrated in Table 2. In some embodiments, the range may include the sub-pixel forgiveness range, plus the extra range of the expected noise deviation.

In some embodiments, a first tile of pixels contains the first pixel and a second tile of pixels contains the second pixel. Comparing the brightness of the first pixel and the particular noise deviation to the brightness of the second pixel may involve determining that the brightness of the second pixel is within a defined range of the brightness of the first pixel, determining that the root-mean-square difference of pixel brightness values of the first tile and pixel brightness values of the second tile exceeds a root-mean-square difference threshold, and based on the root-mean-square difference exceeding the root-mean-square difference threshold, merging no pixels from the second tile with the pixels from the first tile. The defined range may be based on the particular noise deviation.

Alternatively or additionally, comparing the brightness of the first pixel and the particular noise deviation to the brightness of the second pixel may involve determining that the brightness of the second pixel is outside of a defined range of the brightness of the first pixel, where the defined range is based on the particular noise deviation, and possibly based on the brightness of the second pixel being outside of the defined range, not merging the first pixel and the second pixel. In some embodiments, the same or a similar process may be applied to one or more arbitrary color channels of the first and second pixels, instead of or in addition to the brightness value.

A noise model for the image sensor may associate effective color temperatures and gains to mappings between pixel characteristics and noise deviation of the image sensor. Selecting the mapping between pixel characteristics and noise deviation of the image sensor based on the effective color temperature and the particular gain may involve selecting the mapping from the noise model for the image sensor. The noise model may include a plurality of discrete points, in which each point may be defined by a respective color temperature in combination with a respective gain, and may be associated with a respective mapping. In some embodiments, the plurality of images may be captured by the image sensor of a particular camera device, and the mapping between pixel brightness and noise deviation of the image sensor may involve a mapping between pixel brightness and noise deviation of the image sensor and other components of the particular camera device.

Selecting the mapping between pixel characteristics and noise deviation of the image sensor based on the effective color temperature and the particular gain may involve determining that the effective color temperature in combination with the particular gain does not correspond to any of the discrete points. Further, based on the effective color temperature in combination with the particular gain not corresponding to any of the discrete points, a discrete point defined by a target color temperature and a target gain may be selected, and the mapping associated with the discrete point may also be selected. The target gain may be higher than the particular gain, and the target color temperature may be a closest color temperature to the effective color temperature.

In some embodiments, mapping at least the brightness of the first pixel to the particular noise deviation may involve looking up at least the brightness of the first pixel in a pre-determined table to derive the particular noise deviation. Mapping at least the brightness of the first pixel to the particular noise deviation may further include looking up a color value of the first pixel in the pre-determined table to derive the particular noise deviation.

The steps depicted in FIG. 7 may be carried out by a camera device, such as digital camera device 100, a computing device, such as computing device 200, and/or by two or more distinct devices. Further, the flow chart depicted in FIG. 7 may be modified according to the variations disclosed in this specification and/or the accompanying drawings.

In alternate embodiments, images may be captured before color processing. These images may be referred to as "raw" images, and may contain minimally-processed or unprocessed image data from an image sensor. Thus, raw images might not be ready to be printed or edited. However, they may contain enough information to create an image in a more standard format (e.g., bitmap, JPG, PNG, etc.). There are many different raw image formats that may be used by different models of image capture devices.

A noise model may be built for either raw or processed images, for a particular sensor. In a noise model built for raw images for a particular image sensor, there may be a table for mapping various color values (YUV, RGB, etc.), resulting from various analog gains, to noise deviations. The raw noise model may then be used directly on raw images. The raw noise model may also be used on processed images if the color processing is known, and can be simulated (both forward and backward). In other words, the color-processed values of a color-processed image may be un-processed and indexed into the raw noise model to get a noise deviation value. Then, that noise deviation value may be processed forward through the color processing, to see how the noise deviation value would change (e.g., shrink or grow). This color processing may include white balance gains (different gains applied to different color channels to achieve proper white balance), uniform digital gain, spatially-varying digital gain (to correct for lens shading or vignetting), color adjustments via a 3×3 matrix, 3D lookup table, or other methods, tonemapping curves, and so on.

In further alternate embodiments, determining a noise model to apply in a given situation may be based on factor other than or in addition to color temperature and gain. For instance, a third criterion may be used in addition to, or in lieu of, color temperature and/or gain). In some embodiments, this criterion might classify the scene as LDR or HDR. That extra classification might result in different color processing for the image. No matter what classifications are used to decide how to process color, the noise model may use this input to provide the noise deviation(s) to expect for various brightness and/or color values.

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
  determining a color temperature of a first pixel and a brightness of the first pixel, wherein the first pixel appears in a first image that was captured by an image sensor;
  selecting a mapping between pixel brightness and noise deviation of the image sensor, wherein the noise deviation characterizes error in pixels that have the color temperature of the first pixel, wherein the error is introduced when the image sensor is capturing an image;
  using the selected mapping to map at least the brightness of the first pixel to a particular noise deviation; and
  based on the brightness of the first pixel, the particular noise deviation, and a brightness of a second pixel, determining whether to merge the first pixel and the second pixel, wherein the second pixel appears in a second image that was captured by the image sensor.

2. The method of claim 1, wherein a particular gain has been applied to the first image, and wherein the noise deviation characterizes the error in pixels that have the color temperature of the first pixel and have had the particular gain applied.

3. The method of claim 2, wherein the mapping is selected based on the color temperature of the first pixel and the particular gain.

4. The method of claim 1, wherein determining whether to merge the first pixel and the second pixel comprises comparing the brightness of the first pixel and the particular noise deviation to the brightness of the second pixel.

5. The method of claim 4, wherein comparing the brightness of the first pixel and the particular noise deviation to the brightness of the second pixel of the second image comprises:
  determining that the brightness of the second pixel is within a defined range of the brightness of the first pixel, wherein the defined range is based on the particular noise deviation; and
  based on the brightness of the second pixel being within the defined range, merging the first pixel and the second pixel.

6. The method of claim 5, wherein merging the first pixel and the second pixel comprises:
  adding the brightness of the first pixel and the brightness of the second pixel to provide a pixel value sum; and
  dividing the pixel value sum by two to form a merged pixel.

7. The method of claim 5, wherein the defined range is configured such that the brightness of the second pixel is within the defined range when the first pixel and the second pixel are subject to a sub-pixel alignment error.

8. The method of claim 4, wherein a first tile of pixels contains the first pixel and a second tile of pixels contains the second pixel, wherein comparing the brightness of the first pixel and the particular noise deviation to the brightness of the second pixel comprises:
  determining that the brightness of the second pixel is within a defined range of the brightness of the first pixel, wherein the defined range is based on the particular noise deviation;
  determining that the root-mean-square difference of pixel brightness values of the first tile and pixel brightness values of the second tile exceeds a root-mean-square difference threshold; and
  based on the root-mean-square difference exceeding the root-mean-square difference threshold, merging no pixels from the second tile with the pixels from the first tile.

9. The method of claim 4, wherein comparing the brightness of the first pixel and the particular noise deviation to the brightness of the second pixel comprises:
  determining that the brightness of the second pixel is outside of a defined range of the brightness of the first pixel, wherein the defined range is based on the particular noise deviation; and
  based on the brightness of the second pixel being outside of the defined range, not merging the first pixel and the second pixel.

10. The method of claim 1, wherein a noise model for the image sensor associates color temperatures to mappings between pixel characteristics and the noise deviation of the image sensor, and wherein selecting the mapping between the pixel characteristics and the noise deviation of the image sensor comprises selecting the mapping from the noise model for the image sensor.

11. The method of claim 10, wherein the noise model comprises a plurality of discrete points, each point defined by a respective color temperature and associated with a respective mapping, and wherein selecting the mapping between the pixel characteristics and the noise deviation of the image sensor comprises:
  determining that the color temperature of the first pixel does not correspond to any of the discrete points;
  selecting a discrete point defined by a target color temperature, wherein target color temperature is a closest color temperature to the color temperature of the first pixel; and
  selecting the mapping associated with the discrete point.

12. The method of claim 1, wherein mapping at least the brightness of the first pixel to the particular noise deviation comprises looking up at least the brightness of the first pixel in a pre-determined table to derive the particular noise deviation.

13. The method of claim 12, wherein mapping at least the brightness of the first pixel to the particular noise deviation further comprises looking up a color value of the first pixel in the pre-determined table to derive the particular noise deviation.

14. The method of claim 1, wherein the first image and the second image were captured using different total exposure times.

15. The method of claim 1, wherein the image sensor is disposed within a camera device, wherein the mapping between the pixel brightness and the noise deviation of the image sensor comprises a mapping between the pixel brightness and a combination noise deviation of the image sensor and other components of the camera device.

16. An article of manufacture including a non-transitory computer-readable medium, having stored thereon program instructions that, upon execution by a computing device, cause the computing device to perform operations comprising:
  determining a color temperature of a first pixel and a brightness of the first pixel, wherein the first pixel appears in a first image that was captured by an image sensor;
  selecting a mapping between pixel brightness and noise deviation of the image sensor, wherein the noise deviation characterizes error in pixels of the color temperature of the first pixel, wherein the error is introduced when the image sensor is capturing an image;
  using the selected mapping to map at least the brightness of the first pixel to a particular noise deviation; and
  based on the brightness of the first pixel, the particular noise deviation, and a brightness of a second pixel, determining whether to merge the first pixel and the second pixel, wherein the second pixel appears in a second image that was captured by the image sensor.

17. The article of manufacture of claim 16, wherein a particular gain has been applied to the first image, and wherein the noise deviation characterizes the error in pixels that have the color temperature of the first pixel and have had the particular gain applied.

18. The article of manufacture of claim 17, wherein comparing the brightness of the first pixel and the particular noise deviation to the brightness of the second pixel comprises:
  determining that the brightness of the second pixel is within a defined range of the brightness of the first pixel, wherein the defined range is based on the particular noise deviation; and
  based on the brightness of the second pixel being within the defined range, merging the first pixel and the second pixel.

19. The article of manufacture of claim 17, wherein merging the first pixel and the second pixel comprises:
  adding the brightness of the first pixel and the brightness of the second pixel to provide a pixel value sum; and
  dividing the pixel value sum by two to form a merged pixel.

20. A computing device comprising:
  one or more processors;
  memory; and
  program instructions, stored in the memory, that upon execution by the one or more processors cause the computing device to perform operations including:
    determining a color temperature of a first pixel and a brightness of the first pixel, wherein the first pixel appears in a first image that was captured by an image sensor;
    selecting a mapping between pixel brightness and noise deviation of the image sensor, wherein the noise deviation characterizes error in pixels of the color temperature of the first pixel, wherein the error is introduced when the image sensor is capturing an image;
    using the selected mapping to map at least the brightness of the first pixel to a particular noise deviation; and
    based on the brightness of the first pixel, the particular noise deviation, and a brightness of a second pixel, determining whether to merge the first pixel and the second pixel, wherein the second pixel appears in a second image that was captured by the image sensor.

* * * * *